United States Patent
Oldenburg et al.

(10) Patent No.: US 6,752,189 B2
(45) Date of Patent: Jun. 22, 2004

(54) COMPUTER CONTROLLED POSITION SLAVED SERVO LABELING SYSTEM

(75) Inventors: Mark C. Oldenburg, Milwaukee, WI (US); Steven A. Retzlaff, Franklin, WI (US)

(73) Assignee: Krones, Inc., Franklin, WI (US)

(*) Notice: Subject to any disclaimer, the term of this patent is extended or adjusted under 35 U.S.C. 154(b) by 0 days.

(21) Appl. No.: 10/040,051

(22) Filed: Oct. 24, 2001

(65) Prior Publication Data

US 2003/0034111 A1 Feb. 20, 2003

Related U.S. Application Data

(62) Division of application No. 09/357,018, filed on Jul. 19, 1999, now Pat. No. 6,428,639.

(51) Int. Cl.[7] .............................. B65C 9/40; B65C 9/44
(52) U.S. Cl. ....................... 156/362; 156/361; 156/64; 156/363; 156/541; 156/DIG. 44; 156/DIG. 46
(58) Field of Search ..................... 156/64, 351, 362, 156/542, 566, 567, 363, DIG. 44, DIG. 45, DIG. 46, 350, 358, 361, 378, 367, 540, 541

(56) References Cited

U.S. PATENT DOCUMENTS

| | | | |
|---|---|---|---|
| 4,629,528 A | * 12/1986 | Tanaka et al. | 156/351 |
| 4,852,014 A | 7/1989 | Schwenzer | |
| 5,259,913 A | * 11/1993 | Stover | 156/566 |
| 5,427,029 A | * 6/1995 | Dumke | 156/542 |
| 5,650,037 A | * 7/1997 | Larson | 156/540 |
| 5,810,955 A | * 9/1998 | Seifert et al. | 156/362 |
| 5,858,143 A | * 1/1999 | Bright et al. | 156/566 |
| 6,419,782 B1 | * 7/2002 | Johnson et al. | 156/363 |
| 6,550,512 B2 | * 4/2003 | Yang | 156/363 |
| 6,575,216 B2 | * 6/2003 | Yang | 156/351 |

FOREIGN PATENT DOCUMENTS

WO    WO 96/40559    12/1996

\* cited by examiner

*Primary Examiner*—Sue A. Purvis
(74) *Attorney, Agent, or Firm*—Ryan Kromholz & Manion, S.C.

(57) ABSTRACT

A labeling system employs a multi-processing computer control system for a servo motor which drives a label-carrying web. The system is responsive to the physical position of the labels and the physical position of containers or similar objects to which the labels are applied. The label application motion controller identifies the machine position and performs the mathematical calculations needed to create a piecewise continuous function motion profile required to achieve label contact at a predefined contact point on the surface of each container. Multiple functions may be used to construct a motion profile which smoothly accelerates the label at a calculated acceleration needed to cause a label to arrive at the defined contact position on a container and to decelerates the carrier web after application. Correction for measured label registration error is provided for. Because the position of the label is based on the position of the container and a motion profile is calculated for each application, a fixed initial staging position of the label prior to application is not needed.

12 Claims, 19 Drawing Sheets

COMPUTER CONTROLLED POSITION SLAVED SERVO LABELING SYSTEM

RELATED APPLICATION

This application is a divisional of U.S. patent application Ser. No. 09/357,018, filed Jul. 19, 1999 U.S. Pat. No. 6,428,639.

BACKGROUND OF THE INVENTION

The present invention relates to control of container labeling equipment. More specifically, the invention relates to procedures and apparatus for accurately applying labels, such as pressure sensitive labels, to containers, utilizing continual monitoring of the absolute positions of the container and label in order to correctly apply the labels at high container speeds.

Currently-used label applicator systems frequently use a type of motion control system referred to as "velocity slaving". Such systems start a predefined move of the label initiated by a stimulus and wherein the velocity of the label is dictated by the ratio-metric velocity of the container. The feedback as to the container velocity is generated by a main container-handling portion of the machine. Additionally, the end point for the application of the labels carried by a carrier web, to a particular container may be advanced or retarded based on a registration stimulus incorporated into the system.

One example of such a system is that which is described in U.S. Pat. No. 4,294,644. In that patent a servomotor is controlled pursuant to input of information relating to the relative velocities of the container and labels. One important limitation of such systems relates to the inability of many such systems to accelerate the velocity of a web carrying the labels to the linear velocity of the containers. This problem is particularly acute with respect to short labels.

In the '644 patent there is described a control system for a servomotor which is responsive to the rate of feed or speed of the surface to be labeled as it is advanced to the labeler. One aspect of this previous system is to bring the servomotor up to a determined speed which is then held constant based on a assumption that conveyor speed is constant, so that the pulse output derived from a servomotor encoder will match the pulse output derived from the conveyor encoder. Such control systems are an essential feature of speed matching, i.e., "velocity slaving".

Another significant limitation of the velocity slaved labeling process is due to the fact that it is linear in nature. Such linearity is manifested by the direct speed match between the master encoder and predictable linear acceleration and deceleration ramps controlling movement of the labels. By utilizing the linear properties of the velocity profile, basically a trapezoid, the label placement position is derived. Such devices are limited by the fact that very complex requirements may be needed to match the label velocity to the container surface velocity but the master encoder still runs at a constant rate thereby ruling out complex moves. One situation where such applicators fail is where the length of the material available to accelerate to the surface velocity of the container is too short. In this condition there is a requirement that the label carrier web must first be backed up before acceleration begins, which backup move would be a low acceleration, deceleration move in order to maintain necessary web tension, but a simple velocity slaved servo system cannot perform such a function. Limitations are also caused due to unusual shapes of some containers or due to unusual geometry of the labels which may require complex move profiles, which velocity slaved system cannot perform.

SUMMARY OF THE INVENTION

It is a principal object of the present invention to provide a new labeling control system which overcomes the foregoing limitations by utilizing a position slaved motion control system. An important aspect of the present invention is to provide a position slaved system which incorporates sufficient mathematical power to generate the necessary move profiles to control high speed labeling equipment. Such mathematical power is provided by the provision of high speed microprocessors used in conjunction with appropriate mathematical algorithms.

A further important aspect of the present invention involves the intimate coupling of the slave motion control system, which controls a label carrier web's position, to the position of the master feedback device, i.e., an encoder or a resolver, and thus to the position of the containers. In accordance with this aspect, an ability to offset the commanded position of the container (or other specific object on a container) is provided. This offset, in the form of an electronic signal received from a sensing device, identifies the absolute location of the container or object such as a previously applied label, which, in effect, produces an absolute position independent of the main container handling portion of the machine but which is relative to each container or object on the container. Further, in accordance with this aspect, a high precision position control results in the ability to provide very complex motion even at speeds of 750 labels per minute. Further, in accordance with this aspect, the motion of the label-carrying web is not linear with respect to the position of the master, i.e., the container handler. Further, even though accurate label placement cannot be predicted by means of velocity in complex non-linear situations, the use of position slaving, in accordance with the invention, overcomes this limitation.

In accordance with a further aspect of the invention a mathematical algorithm is provided for each specific container configuration or shape to allow for the ability to generate complex move profiles. In connection with such algorithms the position of the label carrier web is related mathematically to the position of each container as it travels and possibly rotates past the label application head. In a general sense the position of the slave carrier web is a function of the position of the master as follows:

$$\text{Slave\_position} = f(\text{master\_position})$$

The function of the slave web position must be continuous throughout all master-feedback positions. Therefore, in the case of multiple functions, the first derivative of each function at the endpoint must equal the first derivative of the next function at its start point. That is, for successive functions f1(i) and f2(i), where $i_o < i < i_f$ and $i_f < i < j_f$ respectively for functions f1(i) and f2(i) we have:

$$\frac{df1(i_f)}{di} = \frac{df2(i_f)}{di}$$

This is adhered to so that a step change in velocity does not occur which could be detrimental to the label placement and damaging to the web material.

Briefly, the invention provides a method of labeling containers which includes providing a container handling machine such as conveyor in the case of an inline labeling machine, and a rotary bottle table in the case of a rotary labeling machine, for successively transporting containers past a label application station. The container handling machine i.e., "machine base" has an associated position signaling device such as a rotary encoder for providing data in electronic form identifying the position of the machine. In the preferred embodiment the encoder makes one revolution each time the container handling machine translates a distance equal to the center-to center distance between successive containers. As will be appreciated by those skilled in the art, the encoder could be set to make more than one revolution per machine pitch, if desired.

A label applicator is driven by a servomotor with said servomotor being controlled by a microprocessor-based slave position motion controller. The label applicator includes an electronic signal generator identifying the motion controller position of each successive label dispensed by the label applicator.

A machine base position control or identifying microprocessor is operatively connected to the label applicator's motion controlling microprocessor and to the machine base encoder. An electronic signal generator identifying the physical position of the container or object such as a previously applied label on the container surface is operatively connected to the position control microprocessor. The machine base position control microprocessor generates signals to the label applicator's motion controlling microprocessor that relates the position of the container to be labeled.

The label applicator servomotor contains an associated position identifying device such as an encoder that provides electronic data to the motion control microprocessor that relates to servo motor position and velocity. The motion control microprocessor is operatively connected to a label applicator servo amplifier, the servo motor encoder and to the machine base encoder. The label applicator servo amplifier is operatively connected and provides power to the label applicator servomotor. The motion control microprocessor generates a move profile for each successive label, using mathematical algorithms, and electronically controls the label applicator servo amplifier to vary the torque applied by the servomotor. Electronic feedback signals from the servo motor encoder and machine encoder to the motion control microprocessor provide the electronic position and velocity feedback data needed to control the torque applied by the servo amplifier and servo motor. Typically in accordance with the invention, such signals are continually generated and processed at a rate of at least once each 125th microsecond.

In accordance with a further aspect of the invention, a host microprocessor generates a pitch based electronic shift register that contains information on the labeling processes that need to be performed on a container. The host microprocessor provides the labeling commands and is operatively connected to a label position motion control microprocessor.

DETAILED DESCRIPTION

Figure 1:
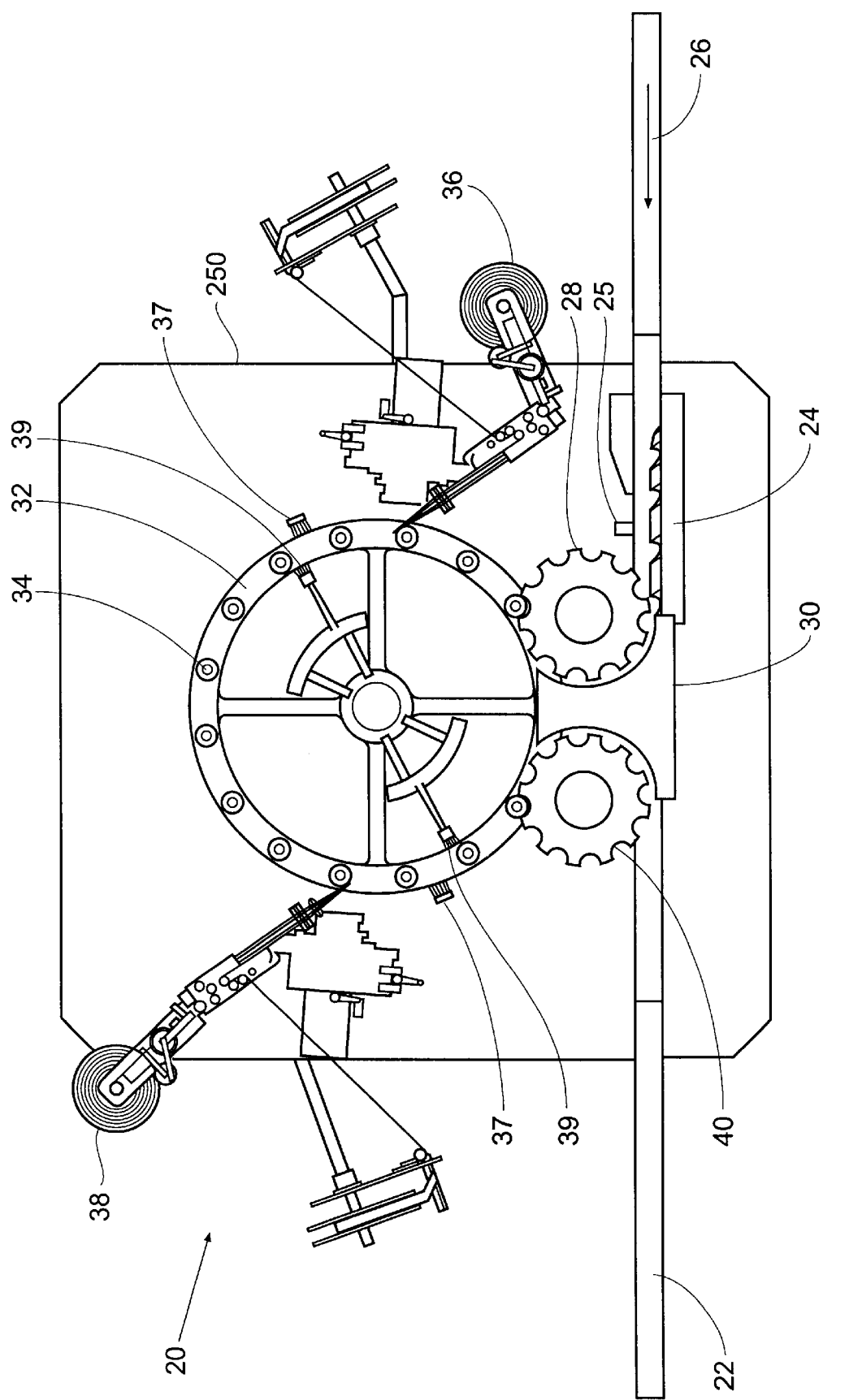
FIG. 1 is a top view of a simplified diagram showing a synchronous infeed rotary, dual application station pressure sensitive labeling machine that employs the invention.

A pressure sensitive label application system consists of equipment that applies pressure sensitive labels which are coated with a adhesive, successively, to the surfaces of a series of containers. A system of this invention is capable of supporting at least from 1 to 4 label application stations, thus applying from one to four separate labels to one container or similar object, in independent mode, and two combinations of the same label on 4 stations in redundant mode. The most general configuration 20 of this system is shown in FIG. 1. This two label application station machine 20 is defined as a synchronous "rotary" machine because the position of each container is governed by the position of the machine.

Containers moving down a conveyor 26 are captured and spaced apart by infeed screw 24. Infeed screw 24 is driven by a gear train that originates at the bottle table 32. As a container travels down the feed screw 24 it is detected by an electronic sensing device, i.e., a "bottle present sensor" 25. The infeed screw 24 will transfer containers in a synchronous fashion and in mechanical coordination with pockets in an infeed star 28. The infeed star 28 is geared to the bottle table 32. As the infeed star 28 rotates, each container will travel along the radius of the centering guide 30 to transfer, in mechanical coordination, to a bottle support plate 34.

As the bottle table 32 rotates on its main bearing 44, containers on bottle plates 34 are carried to the first label application station 36 ("head #1"). In the event that the application station 36 is to apply a label, as a container passes the application station, a label will be applied while the container continues to travel with the bottle table 32. After label application, the container continues through an outside brush station 37 and an inside brush station 39. The brush stations 37 and 39 wipe the label down onto the surface of the container. To assist in the wipe down of the labels, the bottle table 32 contains a mechanical cam track with cam followers attached to the bottle plates. The cam track will cause the bottle plates to rotate during label wipe down through the brush stations. After label application and wipe down, the containers continue to travel to application station 38 ("head #2"). After the label application process is complete at label application station 38 and related wipe down brush stations 37 and 39, the container continues onto discharge star 40. As the container approaches the discharge star 40, which is geared to the bottle table 32, the container is captured by the centering guide 30 to be transferred synchronously to the discharge star 40. The container will travel along the radius of the centering guide 30 to transfer from the discharge star 40 to a discharge conveyor 22.

The position of the bottle turntable 32 is monitored by encoder 274 (FIG. 6) which serves as a position feedback device. Such devices, generally include encoders and resolvers, as will be recognized by those skilled in the art. Such devices are, for convenience and by way of example, rather than by way of limitation, referred to herein as "encoders."

Figure 2:
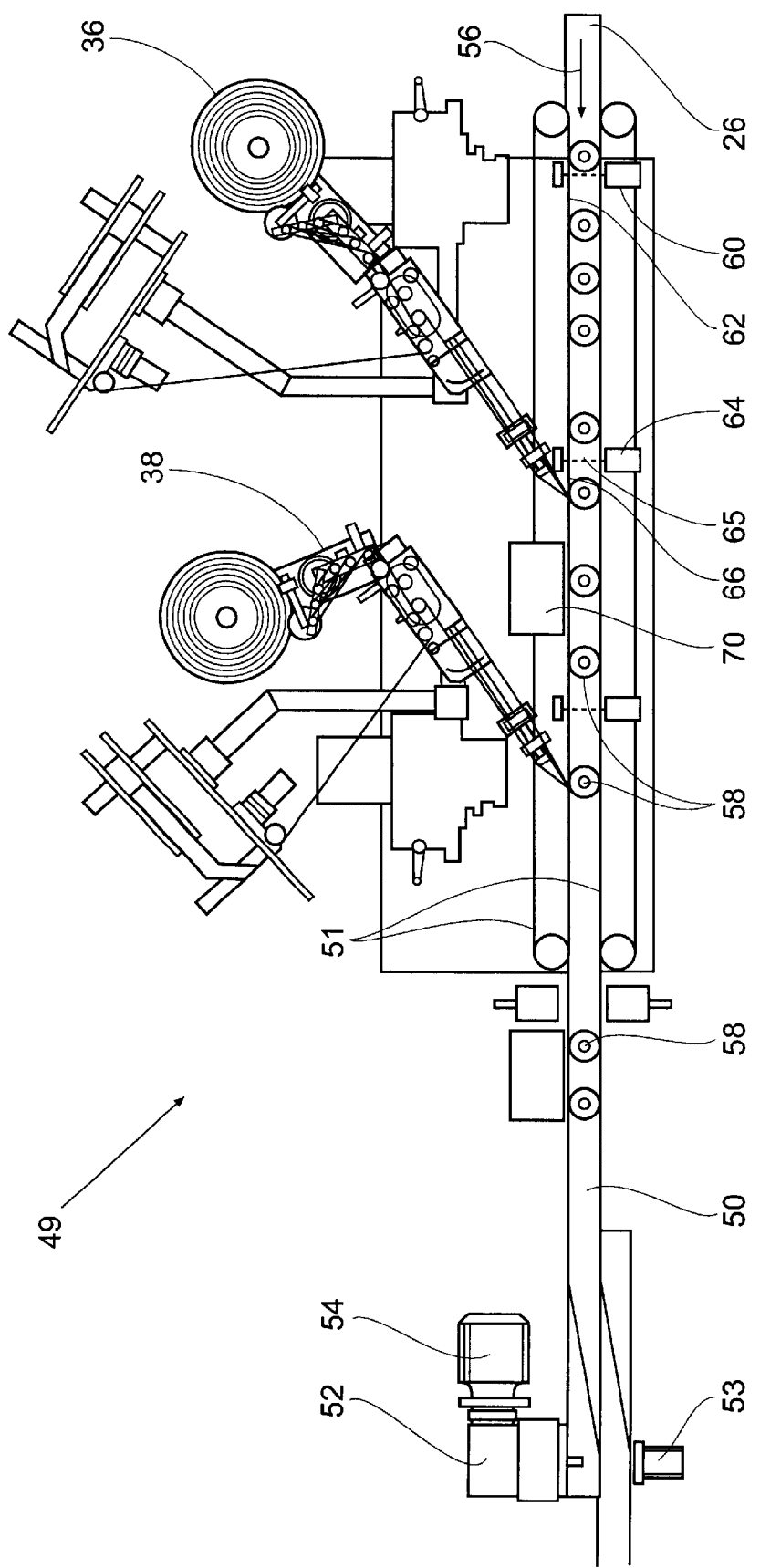
FIG. 2 is a top view of a simplified diagram showing a random infeed linear or inline, dual application station pressure sensitive labeling machine that employs the invention.

A second general configuration 49 of a labeling system is shown in FIG. 2. This machine 49 is defined as a non-synchronous "inline" machine. Such inline machines are considered non-synchronous because the position of the container is random with respect to known pre-defined positions of the machine. The container-handling portion of machine 49 consists of a conveyor 50 and, usually, container-engaging timing belts 51, which are not part of this invention. It will be noted that the machine base encoder 53 is geared to the conveyor drive motor 54 and its gearbox 52 and conveyor 50, such that the encoder 53 will make at least 1 revolution per container.

Containers travel down the conveyor 50 in the direction indicated by the arrow 56 near the infeed of the machine 49. The timing belts 51 capture the containers 58 upon entry to the machine. The timing belts 51 turn traveling generally in the same direction as conveyor 50, and maintain position control of the containers. If desired, the timing belts 51 may be used to manipulate the containers 58, for example, by rotating them, if required in a particular labeling sequence. Containers 58 continue to travel into the machine 49 where the leading edge of each container 58 is detected by an electronic sensing device, which is usually a photoelectric cell, i.e., the bottle present sensor 60 and its retroreflector 62. The electronic bottle present sensor 60 will electronically identify the position of the container with respect to the machine base encoder 53. Such identification or "position stamping" of the leading edge of the container establishes the physical position of the container within the machine 49.

As container 58 continues into the machine towards the application station 68 ("head #1"), an electronic sensing device, the "position latch sensor" 64, detects the leading edge of the container 58 and identifies or "position stamps" its location with respect to the machine encoder 53. This new position stamp enables correction of position error of the container 58 prior to labeling. Such errors may be caused by irregularities in the container configuration or dimensions, positioning on the machine base, etc. The container will then continue on to the label application station 68 ("head #1"). In the event that the application station 68 is to apply a label as a particular container that passes the application station, a label will be applied while the container continues to travel with the conveyor 50. After label application, the container continues through the brush station 70 which wipes the label down onto the surface of the container 58 as the container rotates across a brush.

On inline machines of this type, each label application head 68 or 78 applies the same label, with one head being active and the other in standby. If label application 78 ("head #2") is active, while label application head 68 is inactive, the sequence of operation remains the same.

Figure 3A:
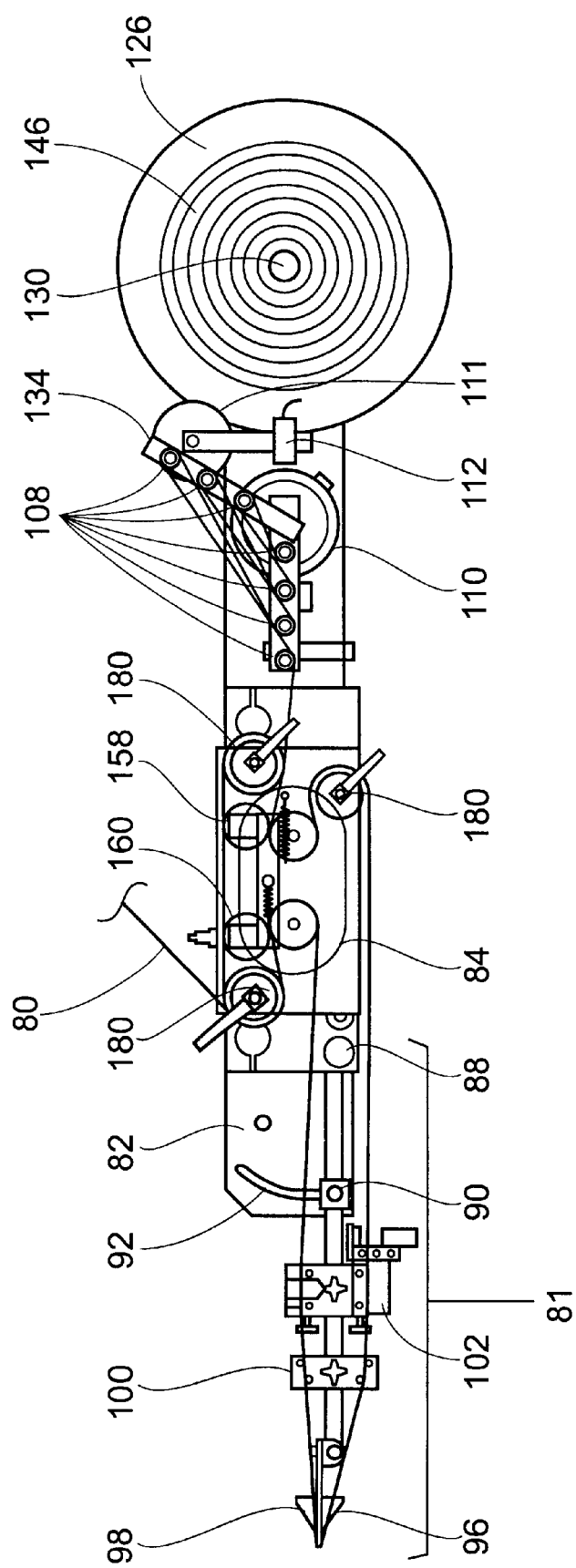
FIG. 3a is a top view and FIG. 3b is an elevational view of the label application head assemblies shown in FIG. 1 and FIG. 2.
Figure 3B:
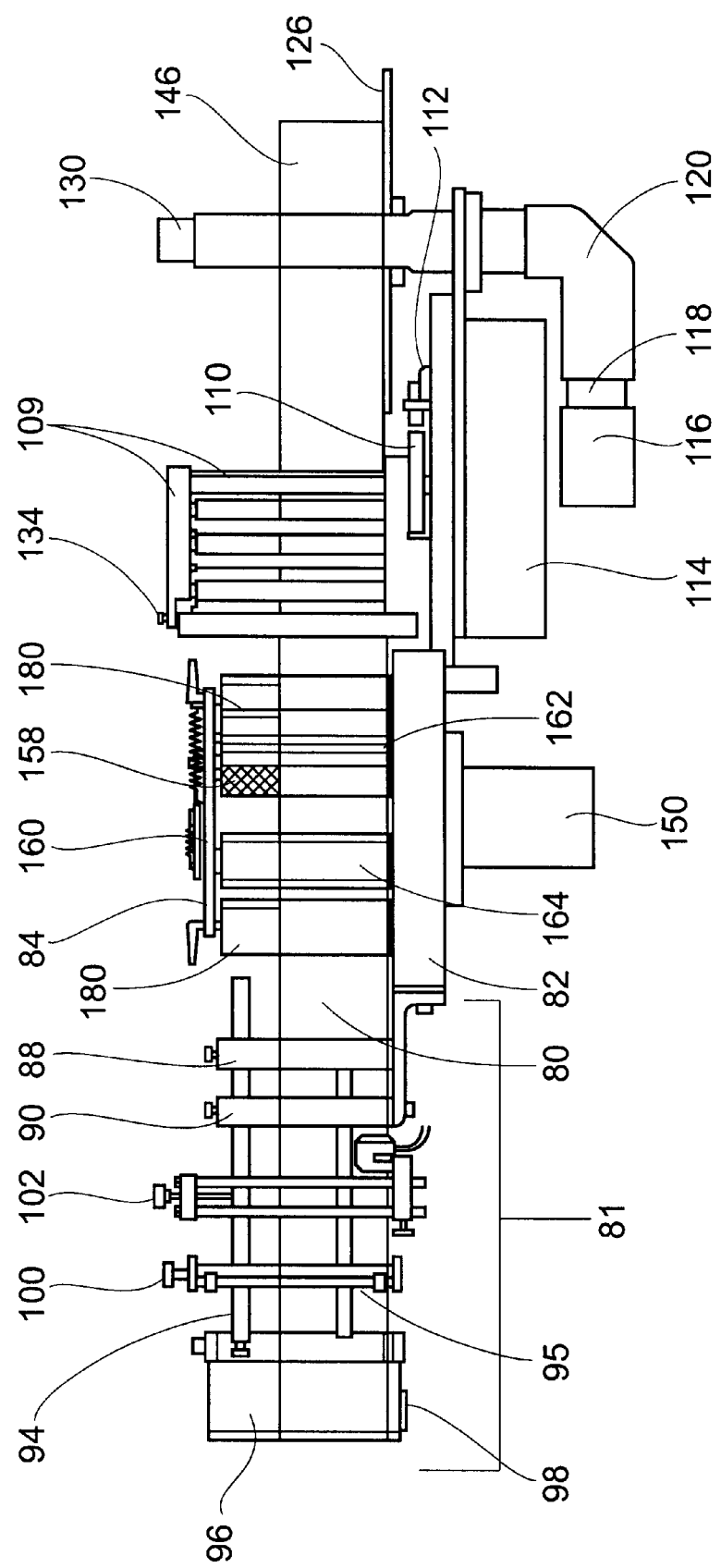
Figure 4A:
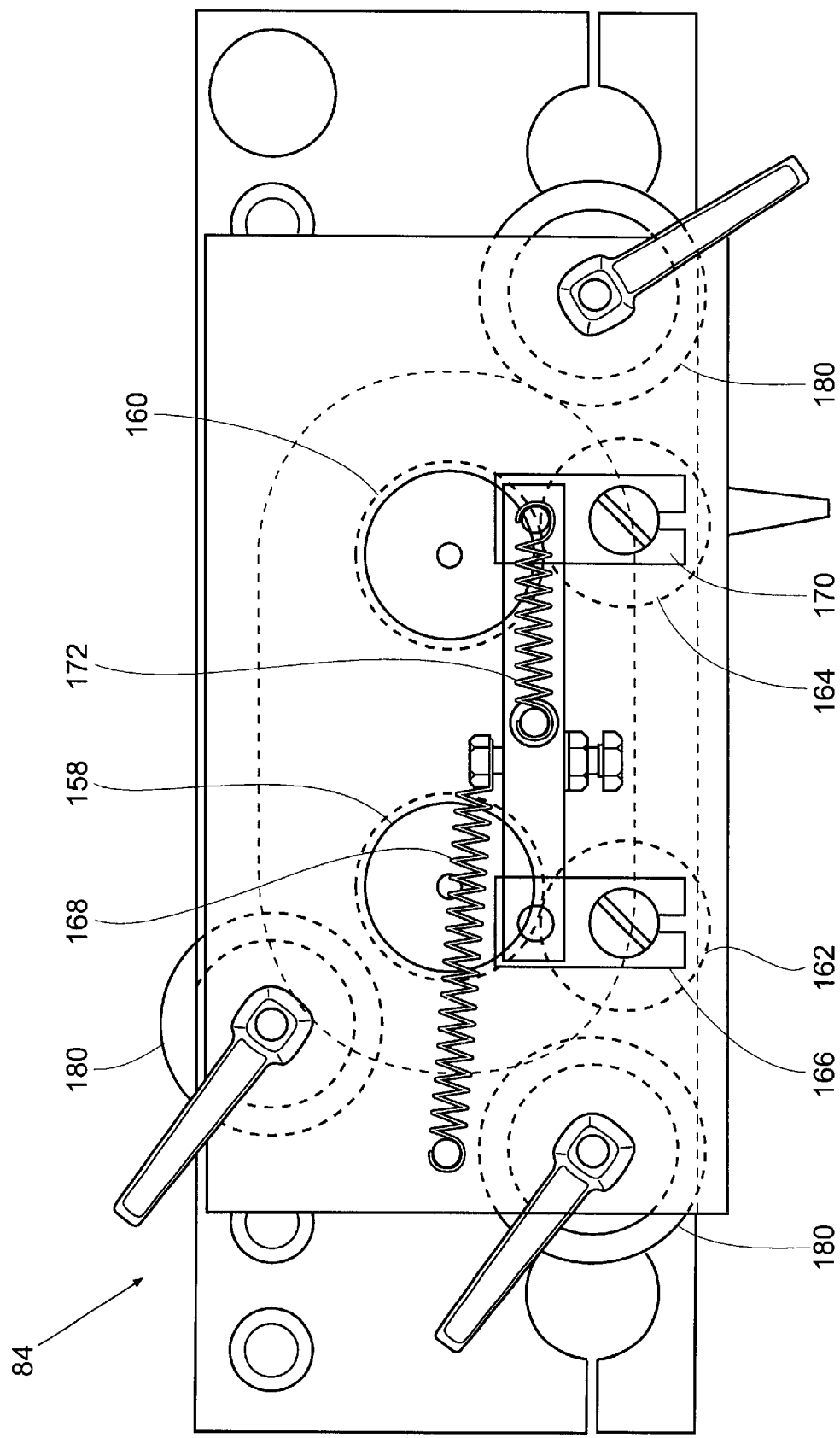
FIG. 4a is top, 4b bottom and 4c elevational view of the servo driven actuator sub assembly shown in FIGS. 3a and 3b.
Figure 4B:
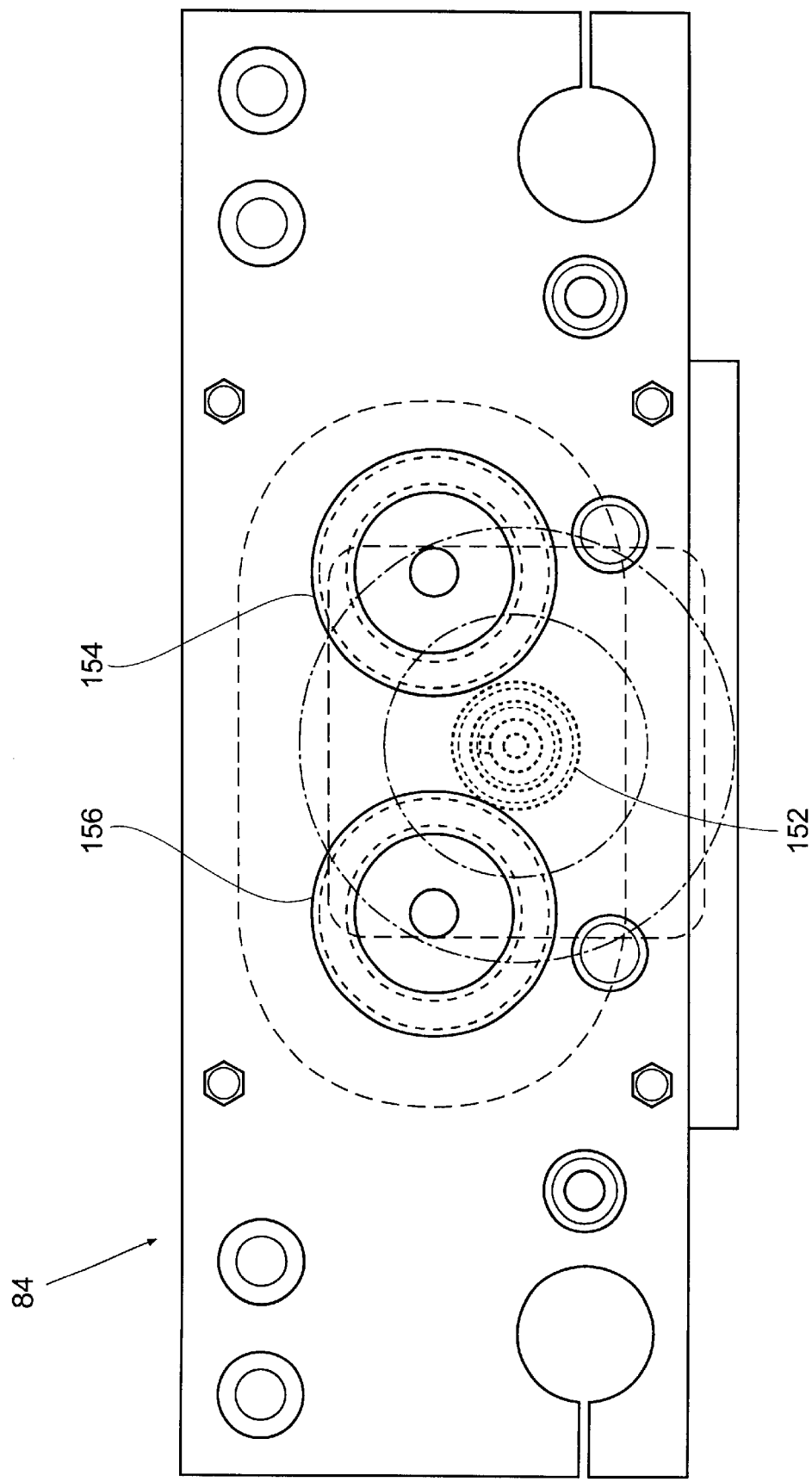
Figure 4C:
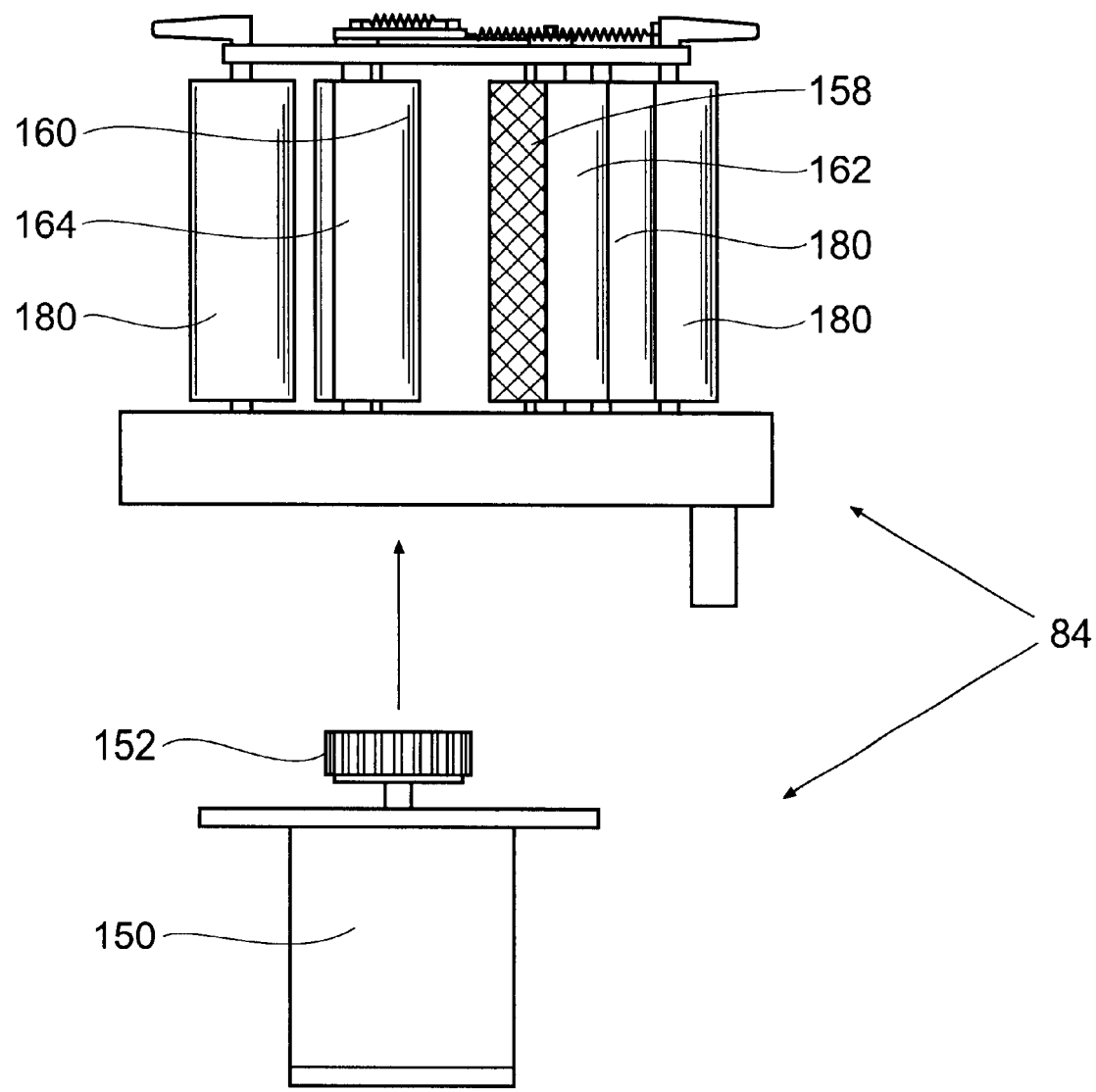

The label application head 68 or 78 is responsible for the motion of the web 80 and the transfer of the leading edge of a label 306 to the surface of a container. As shown in FIGS. 3a and 3b, web 79 which carries labels 80 enters a push-pull actuator assembly 82 shown in detail in FIG. 4c. The web 79 with labels 80 passes around a first idler roller 180 and then proceeds around the smooth "push" capstan roller 160. The web 79 with labels 80 leaves the push-pull unit and proceeds to spender arm assembly 81. The spender arm assembly 81 of a type know to the art, is composed of the spender arm mounting bracket 88, spender arm pivot bracket 90, spender arm pivot groove 92, spender arm upper rod 94, and lower rod 95, spender plate 96, spender plate foot 98, web guide assembly 100, and sensor mounting assembly 102.

The web 79 with labels 80 will pass across the front of the spender arm to and around the edge of the spender plate 96 thereby causing the labels to separate from the web, in know fashion. The web 79 without labels will then continue on to and around another idler roller 180 to the "pull" capstan 158. The web continues around the "pull" capstan 158 and continues on to the rewind dancer assembly rollers 108. After the web passes through the rewind dancer assembly 109, the web is rewound onto the rewind capstan 130, as a roll 146.

The rewind dancer is constructed of a series of rollers. One set of rollers are stationary, with the other set mounted to a dancer arm 134 connected to a pivot shaft that is in turn connected to the rewind proportioning disk 110. An electronic signal generator 112 monitors the position of the proportioning disk 110. As material leaves the push-pull assembly 84, the dancer arm 134 moves toward an open position to provide for storage of the material due to the force applied by the spring tension device 111. The electronic signal generator 112 monitors the position change of the proportioning disk 110 and outputs an analog electronic signal to the motor drive 114 that feeds power to the DC unwind motor 116. The DC unwind motor 116 drives its gearbox 118 through a right angle shaft adapter 120 to drive the rewind capstan 130 and disk 126. As the rewind capstan 130 rewinds material, the dancer arm 134 will move towards a closed position thus causing the electronic signal generator 112 to reduce the analog signal to the rewind drive 114, thus reducing the speed of the motor 116.

The smooth "push" capstan 160 is attached to its drive gear 156 (FIG. 4b), with the knurled "pull" capstan 158 being also attached to a drive gear 154. The servomotor 150 through the servomotor drive gear 152 drives the gears 160 and 156.

Rubber coated nip rollers 164 and 162 have eccentric shafts that are actuated by the nip pressure actuation levers 166 and 170. Spring 172 applies tension to the "push" capstan nip pressure actuator lever 170. This actuation causes the rubber coated nip roller 164 to apply pressure to the smooth "push" capstan 160. Spring 168 applies tension to the "pull" capstan nip pressure actuation lever 166. This actuation causes the rubber coated nip roller 162 to apply pressure to the knurled "pull" capstan 158. The nips between the capstans 160 and 156 and the rubber coated nip rollers 164 and 162, respectively, pinch the web 80 such that there is no web slip across the knurled capstan 158, and there is nip pressure controlled slip across the smooth capstan 160. The circumference of the smooth capstan 160 is slightly less than the circumference of the knurled capstan 158. The drive gears for the capstans 160 and 158 are the same size. As the servomotor 150 drives the capstans 158 and 160 which move the web material across the spender plate 96. The mismatch in circumference between the two capstans causes the web to acquire tension. Web tension is dictated by the frictional component of the web 80 to the surface of the smooth capstan 160. The applied pressure of the rubber nip roller 164 dictates the quantity of friction to the smooth capstan 160. The web tension controls the peel angle of the label as it leaves the web, as the web is pulled around the sharp edge of the spender plate 96.

Figure 5B:
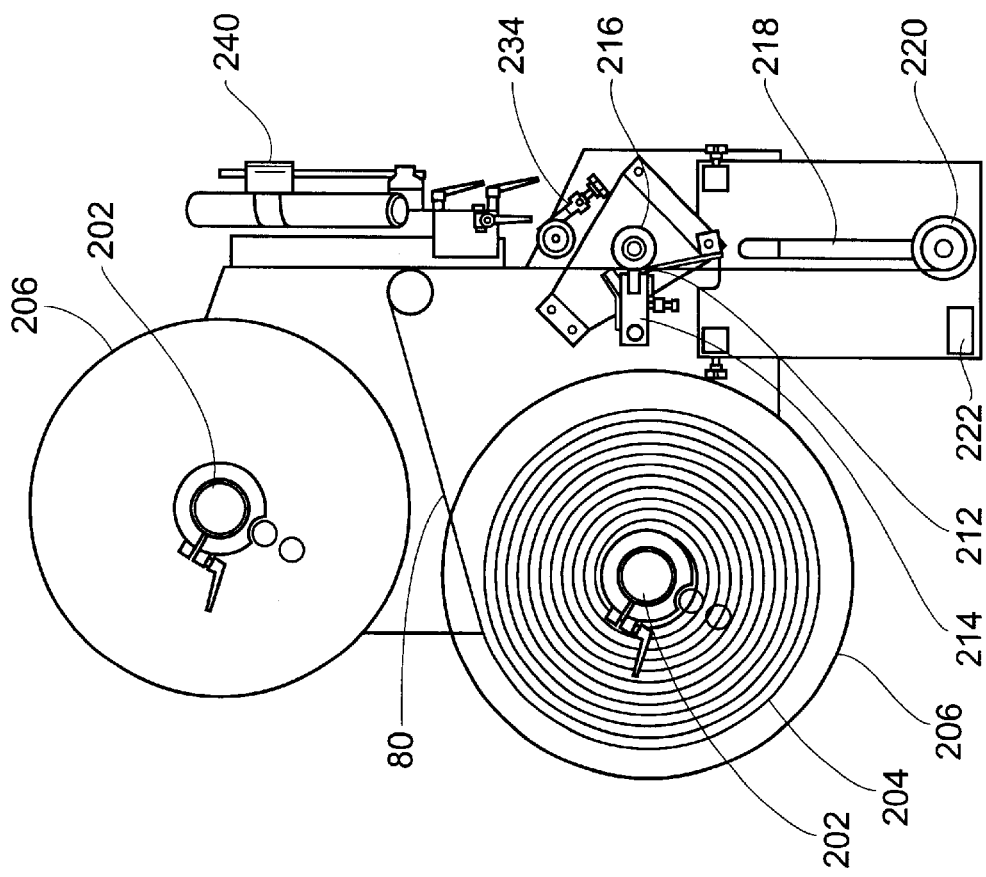
FIG. 5a is a side elevational and FIG. 5b is a front view of an unwind station sub assembly.
Figure 5A:
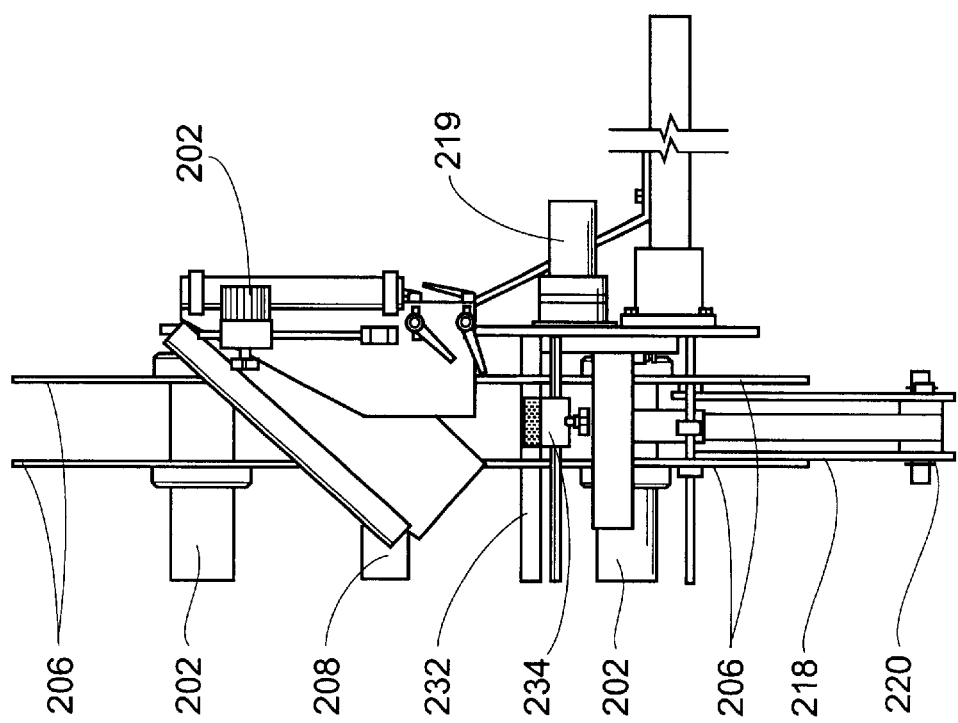

The unwind station shown in FIGS. 5a and 5b is a stand-alone system that functions to provide web material 79 with labels 80 to the label application head 68 or 78 from a roll of label material. The unwind station also provides an inertia buffer between the high acceleration web drive assembly 84, FIGS. 4a, 4b and 4c, and the large inertial load of the material reel 204. A supply roll of unused label material 204 is mounted onto the unwind hub 202 and fixtured between the unwind disks 206. The web material 79 with labels 80 is pulled from roll 204 by the nip 212 created by the nip roller assemble 214 and a rubber coated unwind drive roller 216. The unwind drive roller 216 is connected to the DC motor 219 and controlled by the electronic signaling device 220. As the label application head dispenses labels, the web inertia buffer gravity loop bobbin 220 will move up as web material is pulled from the buffer zone 218. An electronic signaling device 222 signals the motor 219 to turn on. The motor 219 drives the unwind drive roller 216 which in turn pulls web material across the web guide idler roller 208 and from the material roll 204. As the unwind drive roller 216 pulls material from the material roll 204 into the buffer zone 218, the bobbin 220 will move down until the electronic sensing device 222 detects the bobbin 220 thus turning the motor 219 off. The web tension brushes 234 and 240 apply tension to the web 80 to stabilize the web path.

Figure 6:
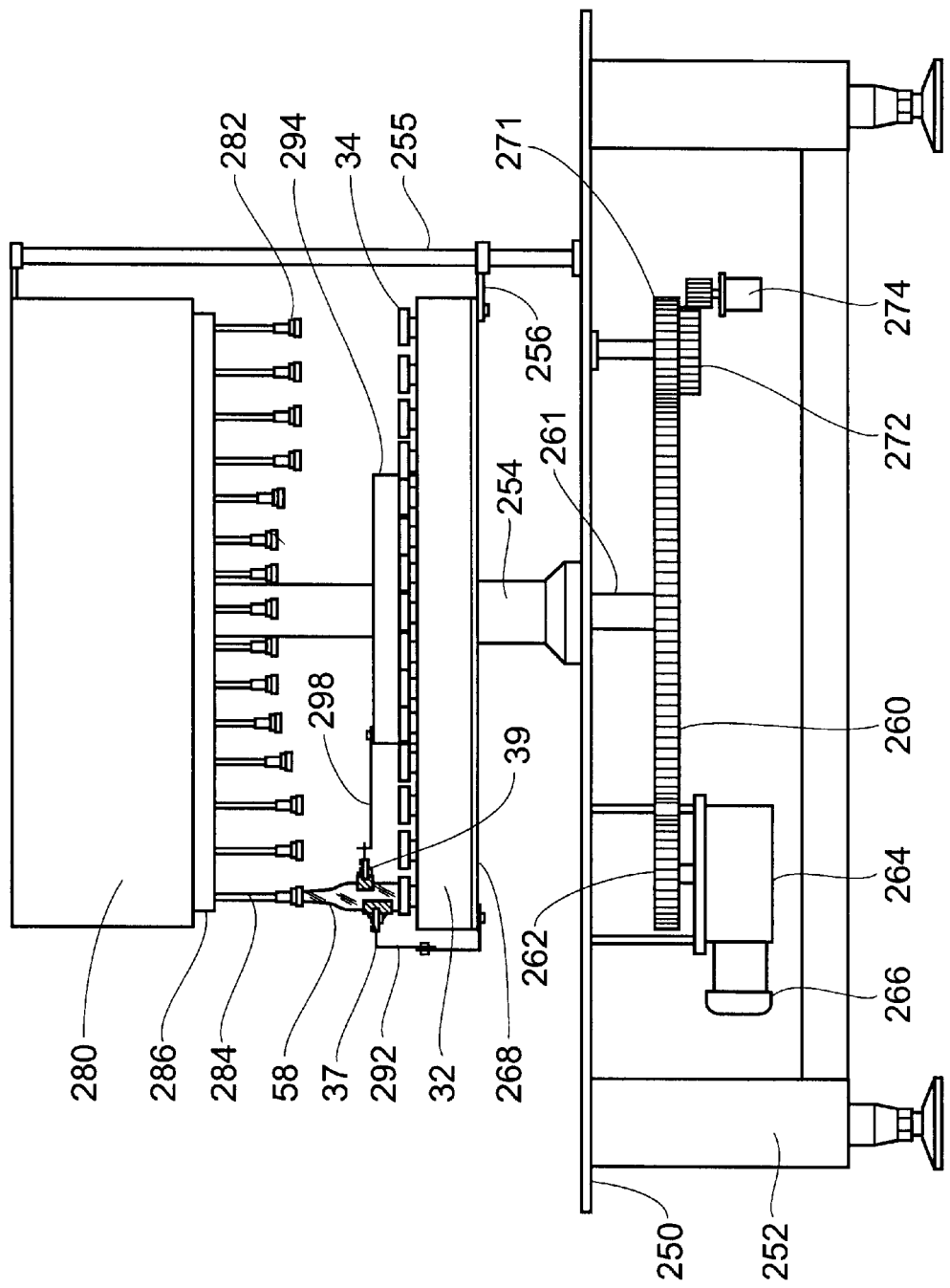
FIG. 6 is a simplified elevational view of a rotary machine base.

The machine base 20, shown, in elevation in FIG. 6, is responsible for the flow of containers and their positions with respect to the application heads 36 and 38. A rotary encoder 274 geared to the bottle table 258 through main bull gear 260. The main bull gear 260 is driven by main drive gear 262, which in turn is driven by gearbox 264 and the main drive motor 266. The master encoder 274 is geared to the machine such that it makes one revolution per container. This is accomplished by the correct selection of intermediary encoder gears 271 and 272. The master encoder 274 provides feedback to the computer control systems on each containers physical location on the machine.

Bull gear 260 drives main bearing shaft 261, which in turn drives the rotating components including the bottle table assembly 258 and carrier assembly 286. The main bearing housing 254 supports the rotating components and the non-rotating bottle table cam housing assembly 268. The containers in the machine are fixtured by the bottle plates 270 and the centering bells 282 which are connected to the spring loaded centering head 284, that is affixed to the carrier assembly 286. As containers are processed through the machine, cam segments in the bottle table cam housing assembly 268, turn the containers to the correct kinematic positions that relate to the needs of the appropriate process. The kinematics include presentations and motion for labeling, label wipe down and other process such as inspection or coding. FIG. 6 includes examples of the wipe down brush stations including the outside brush station mount 269, the outside brush mount assembly 292, the wipe down brush 290 and the inside brush mount 298, with its associated inside wipe down brush 296. The support columns 255 affix the non-rotating portions of the machine head 280 and cam carrier housing 256. The brush station bearing 294 is affixed to the outside of the machine base table plate 250 and affix the inside brush stations to the non-rotation machine base. The table plate support assembly 252 supports the machine table plate 250.

The correlation of the encoder 274 to the machine base position is defined as the machine master axis. On rotary machines, the centerline distance between two containers is defined as one pitch.

Label application control is accomplished with a multi-processor computer controlled servo system or motion control system. See FIG. 17. The motion control processor 520 with its corresponding servo amplifier 524 and servomotor 526 are responsible for the actual motion of the label carrying web 80. Computer host processor 536 is responsible for the system background tasks, internal machine process shift register and process rules. The container tracking processor 528 is responsible for all machine position controls.

As a container enters the machine an electronic signaling device the bottle present sensor 538 signals the container tracking processor 528 that a container is entering the machine. The container tracking processor 528 electronically notifies the computer host processor 536 that a container is present. The computer host processor 536 enters a valid container into the internal labeling process shift register. As the machine continues to rotate the z axis pulse of the master encoder 522 providing electronic position signals to the container tracking processor 528, indicates the beginning of the next pitch cycle. The container tracking processor 528 will electronically indicate to the computer host processor 536 that a new pitch has started. The computer host processor 536 will increment the internal labeling process shift register.

The labeling process shift register pitch increment process will continue as the container moves through the machine, until the container reaches the label application head or a container/label position correction sensor 534. In the event that the machine incorporates the use of the optional container/label position correction sensor 308, the position of a surface artifact such as a surface embossment on a container or a previously applied label 306 (FIG. 7), may be used as a position reference for a container 58 which is, thus, independent of the container fixtures 34 of the bottle table 32. When the beam 310 of the electronic signaling device 308 is interrupted by the leading edge of the label 306 a signal is generated.

Figure 17:
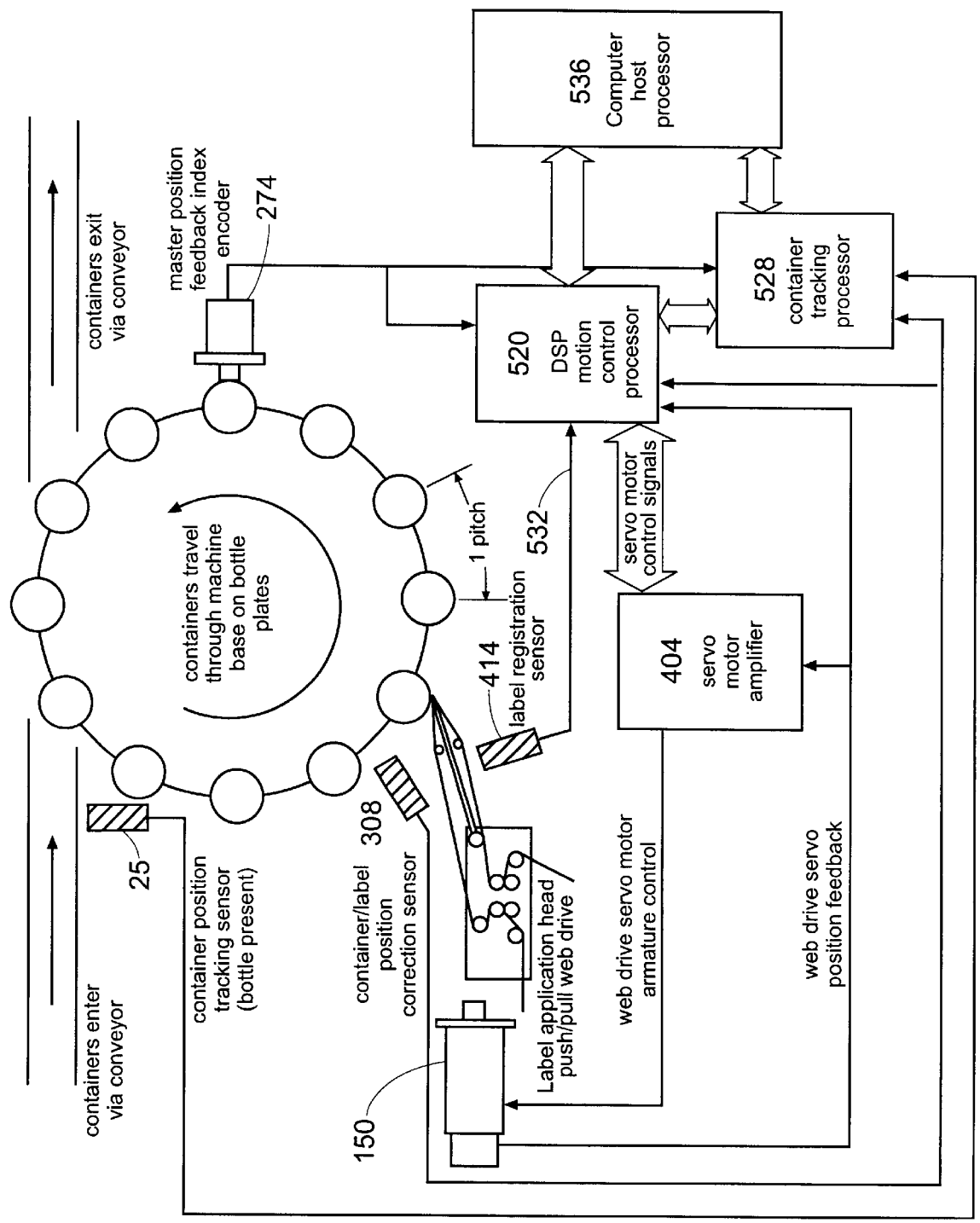
FIG. 17 is a simplified labeler system functional diagram.

As seen in FIG. 17, the electronic signal generated by the container/label position correction sensor 308 provides a position locating electronic signal or "stamp" to the container tracking processor 528 which relates to the exact position of the master encoder 274. The stamped position of the master encoder 274, is then electronically compared to a preset application parameter in the container tracking processor 528, which specifies the predicted position of the tracked artifact thus generating a label contact point position offset.

The label contact point position offset in turn is used to edit, electronically, the preset label contact point position parameter which dictates the position on the container to which the label is to be applied.

As the container proceeds to the position on the machine where the label is to be applied, the computer host processor 536 indicates electronically to the container tracking processor 528 that a container is to be labeled. As the container enters the labeling zone the container tracking processor 528 electronically signals the motion control processor 520 to begin the labeling process.

Figure 10:
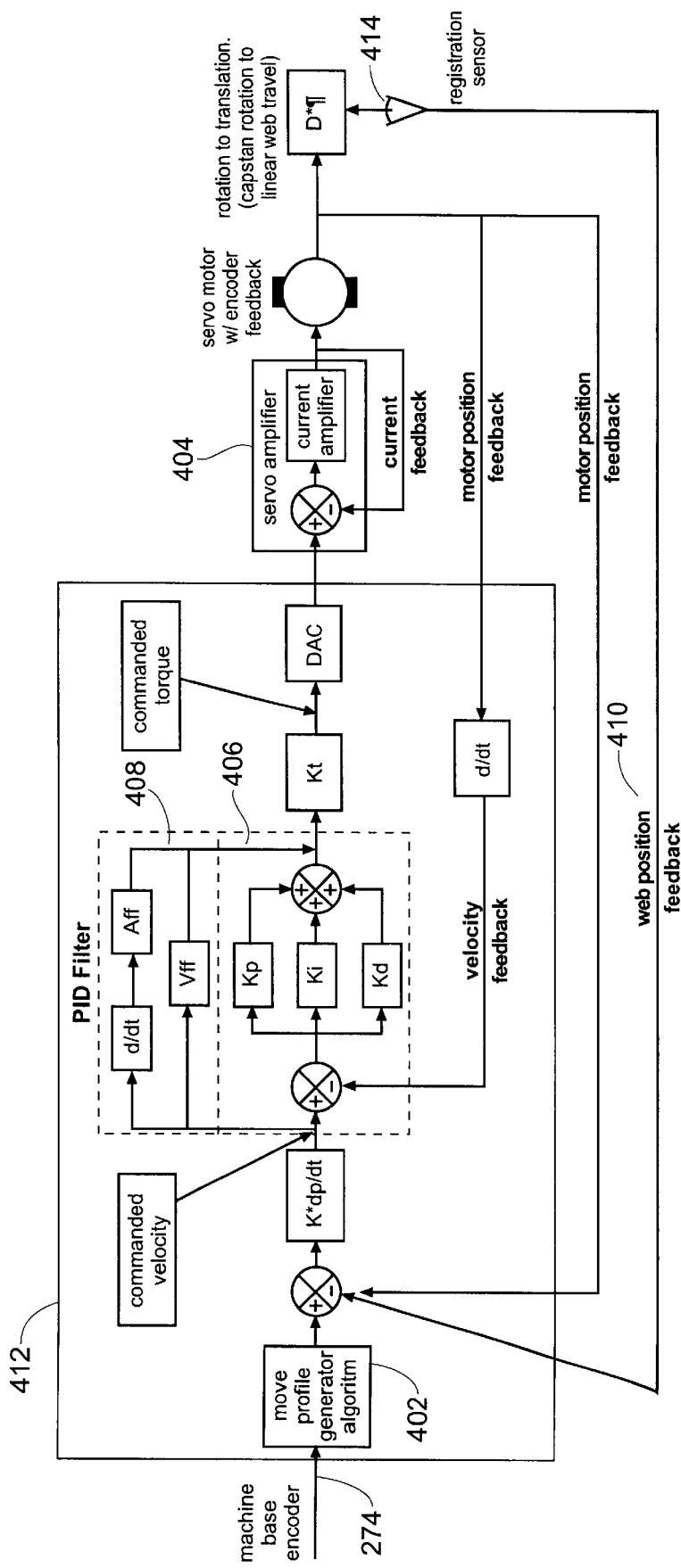
FIG. 10 is a schematic diagram of a positioning servo system feedback loop.

Referring to FIG. 10, the correlation of the motion control system's internal position feedback; that is the servo loop closed around the web drive motor feedback 411, with respect to the label carrying web position feedback 410, is defined as the labeling axis. To successfully complete the labeling process, the leading edge of each label must applied to a precise position on the associated container and the velocity of the label during application must match the surface velocity of the container.

Between label applications, the motion profile is required to prepare itself for the next labeling process as well as to correct for any registration error which may have occurred. The means of performing the label application motion is through a position slaved move profile. That is, a move profile where the labeling axis position is based on the position of the master axis encoder 400, of the machine base.

The servo loop of the labeling axis 412 is also a closed position loop with the label's leading edge used as a registration mark where and in feedback is provided by electronic signaling device 414, the registration sensor, which electronically position stamps the labeling axis position at the point of the registration mark. This correction can only be allowed to occur when the actual labeling process is not being performed in order to reduce label-to-container surface velocity mismatch which would result from attempted position correction during label application.

The process of motion control referred to as position slaving relies fundamentally on the use of a master axis and a slave axis. The master axis indicated by encoder 274 provides feedback for computing the commanded position of the servo system of the slave or labeling axis. For each master position feedback unit or count, the slave axis is assigned a corresponding position. In the preferred example, the master feedback relates to the position of the machine base and is mechanically geared such that the feedback period is one machine pitch in length. Note that the period is measured in distance instead of time since this is not a time based motion controller, but a position based controller.

Using a position slaved servo loop can be described, in general, by means of a block diagram of the basic components of the servo loop. Referring again to FIG. 10, we see that the main reference bench mark that dictates the motion is the position of the machine base encoder 274. This position is signaled to processor 528 which utilizes a profile-generating algorithm 402 such that the desired position of the label web is directly related to the machine base position based on the algorithm's mathematical equation. The resulting motion profile ideally can be generated and updated continually if the processing power of the servo controller is sufficient. If this is not possible, the motion profile could also be generated, only upon receiving new setup information relating to the geometry of the label, web, container, or machine which is stored in a look up table. The position slaved servo system would then generate its motion profile by referencing the look up table and utilizing the master feedback as an index to the table. Then, only the servo loop update and registration correction algorithm calculation are performed in real time.

The remaining blocks in the diagram FIG. 10, describe a general type of high performance positioning servo system. The system utilizes the torque controlled servo amplifier 404 closed around a proportional, integral, derivative (PID) servo loop 406 utilizing velocity and acceleration feedforward terms 408 to essentially eliminate following error in the system.

Figure 11:
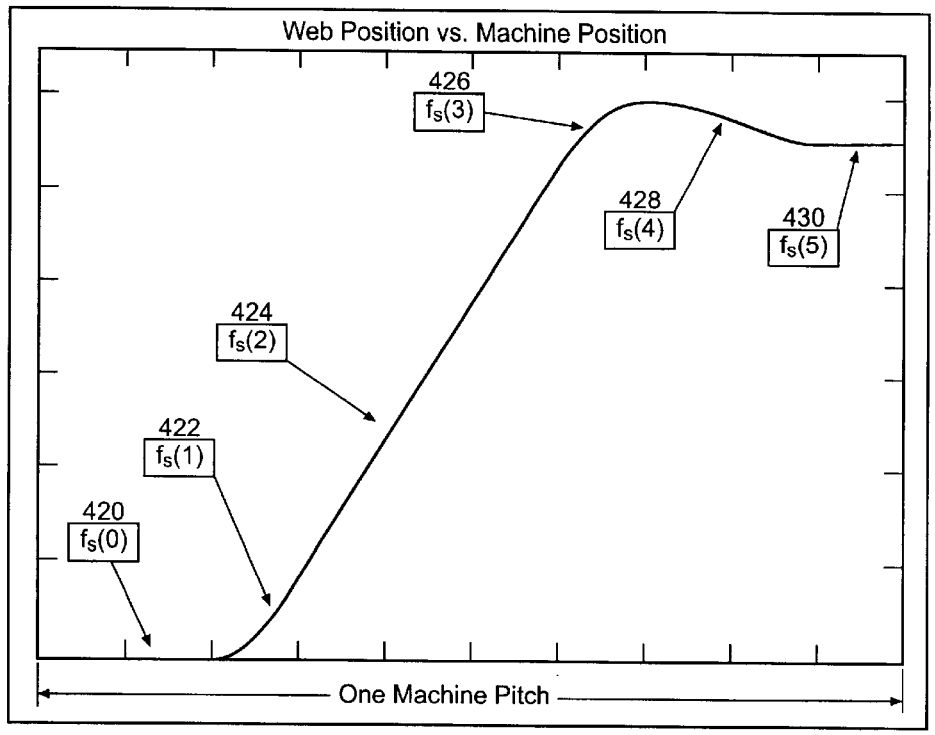
FIG. 11 is a 6 function piecewise continuous function motion profile plot showing, web position vs. machine position.
Figure 12:
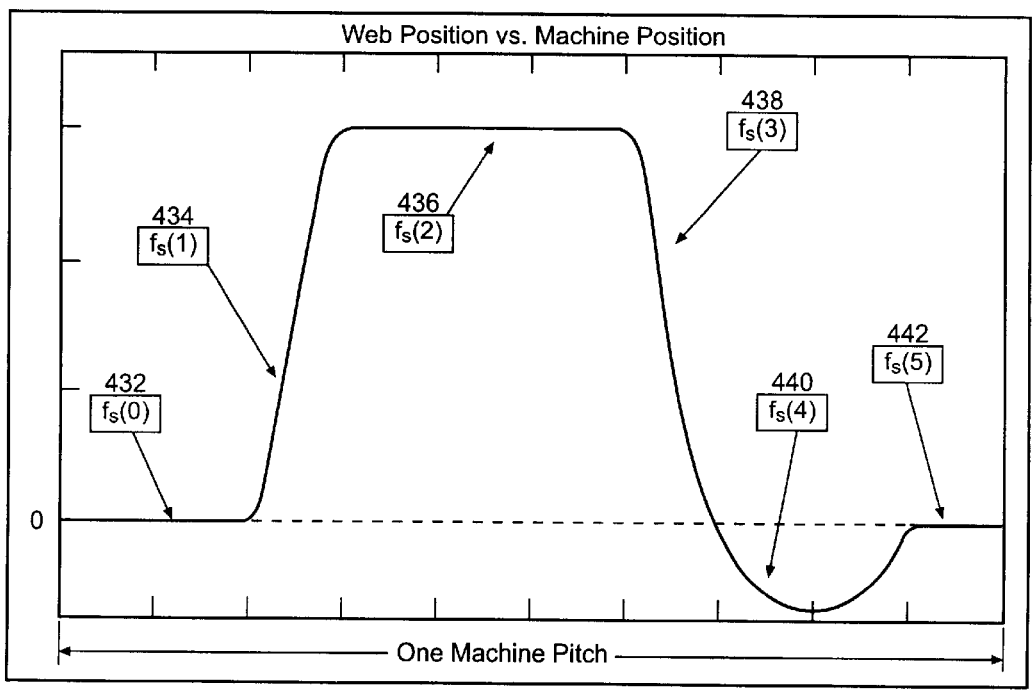
FIG. 12 is a 6 function piecewise continuous function motion profile plot of, web velocity vs. machine position.

The position slaved motion profile, illustrated graphically in FIGS. 11 and 12, will implement a piecewise continuous function comprised of a minimum of three separate functions. These functions are represented by mathematical equations wherein the mathematical expression is a function of master feedback counts. The three basic portions of the illustrated complete function are: the label application function, which is based on the geometry of the machine and the container; the pre-labeling move which primarily is the portion of the move that accelerates the web so that it has reached labeling velocity at the precise position of label placement on the surface of the container while making a smooth transition to the label application function; the post-labeling move which handles the deceleration, the recording of any registration error, and the preparation of the web position for the next label application, taking into account any observed registration error. It should also be noted that each of the basic portions of the function may be comprised of multiple sub-functions. The total function of the move profile, $f_T$ (i), is expressed as follows:

$$f_T(i) = \sum_{s=1}^{n} f_s(i)$$

The plots shown in FIG. 11 and FIG. 12 illustrate such a motion profile, which is comprised of 6 functions pieced together to form a single continuous function.

The functions shown in FIGS. 11 and 12 of the curve denoted as $f_s$ (0) 420 or 432 and $f_s$ (5) 430 or 442 are regions where the label web axis is in servo lock but no motion is commanded. This would represent the position between containers where no labeling action is required.

The function denoted as $f_s$ (1) 422 or 434 is the region of acceleration of the web. The function denoted as $f_s$ (2) 424 or 436 represents a region of the curve where the labeling process is occurring. As can be clearly seen in FIG. 12, the illustrated curve in this case is a constant velocity function. This is not, however, generally the case for applications with complicated container geometry or special labeling requirements. Referring again to FIGS. 11 and 12, the function denoted as $f_s$ (3) 426 or 438 is the region of deceleration of the web. The example shown utilized a sinusoidal profile generator in both the position (FIG. 11) and velocity (FIG. 12) domain of the profile.

The function denoted as $f_s$ (4) 428 or 440 is optional as shown. Function $f_s$ (4) 428 or 440 would be used to back the web up to allow for more web material to be made available in the event that the servo system does not have the acceleration capabilities to achieve the surface velocity of the container within the constraints of the label application travel distance. The label application travel distance is comprised of the label length plus the gap between adjacent labels on the web. A situation requiring $f_s$ (4) presently occurs on pressure sensitive labeling machines where the application requires short labels on high surface velocity machines. Note that these functions can not be performed on prior art velocity slaved system.

The example shown utilizes a sinusoidal profile generation utilizing a half period in the position domain as shown in FIG. 11. Region $f_s$ (4) 428, 440 or $f_s$ (5) 430, 442 will also be utilized as the regions where registration error correction is accomplished. This is necessary to account for the outer position loop 410, FIG. 10 to be closed around the web material itself. It is desirable to perform the correction here since the label application has been completed and the system is simply preparing for the next application.

The concept of a position slaved motion control system has been defined and its benefits have been explained. Next, the manner in which this motion control system relates to a pressure sensitive labeling process on a machine, will be explained. There are several basic building blocks in the motion control system which are necessary for position slaved control. They are shown in FIG. 17 as follows:

A motion control processor 520 that incorporates the use of microprocessors capable of performing math intensive functions at a very high rate is provided. Recent technological advances in microprocessor architectures has made available today, devices that provide the needed computational speed to perform complex mathematical position loop closure. This technology includes digital signal processors such as the advanced or modified Harvard architecture processor.

Because microprocessor technology continues to advance, the nature of the microprocessor is not directly a part of the invention except in so far as the ability to process and calculate complex mathematical equations that relate to the position of a label to be applied to a container has been made possible by the present level of computer technology.

The motion control processor 520 must perform at a rate of at least one position loop update every 125 microseconds for the pressure sensitive label application. This is necessary to maintain the placement accuracy of the labels at very high linear web speeds and accelerations.

An encoder 274 or, alternatively, a rotary resolver, which serves as a feedback device on the machine base serves as the master feedback position index. This provides the index through which the motion control processor 520 produces the position-slaved motion profiles.

A high performance web drive servomotor and amplifier 150, 404. The system must have a very high torque to inertia ratio to achieve the necessary accelerations for a machine running in excess of 750 cycles per minute.

A high speed input 532 into the motion controller 520, which performs a hardware capture of the slave axis position is necessary. This input should be able to identify the axis position in less than 20 microseconds. This input is connected to the electronic signal device 530 utilized for registration error correction of the labels on the web material.

The container tracking processor 528 is responsible for identifying the container position and the computer host processor 536 is responsible for the process overhead, diagnostics, and rules. The container tracking processor 528 and the computer host processor 536 will be discussed in detail later.

Figure 9:
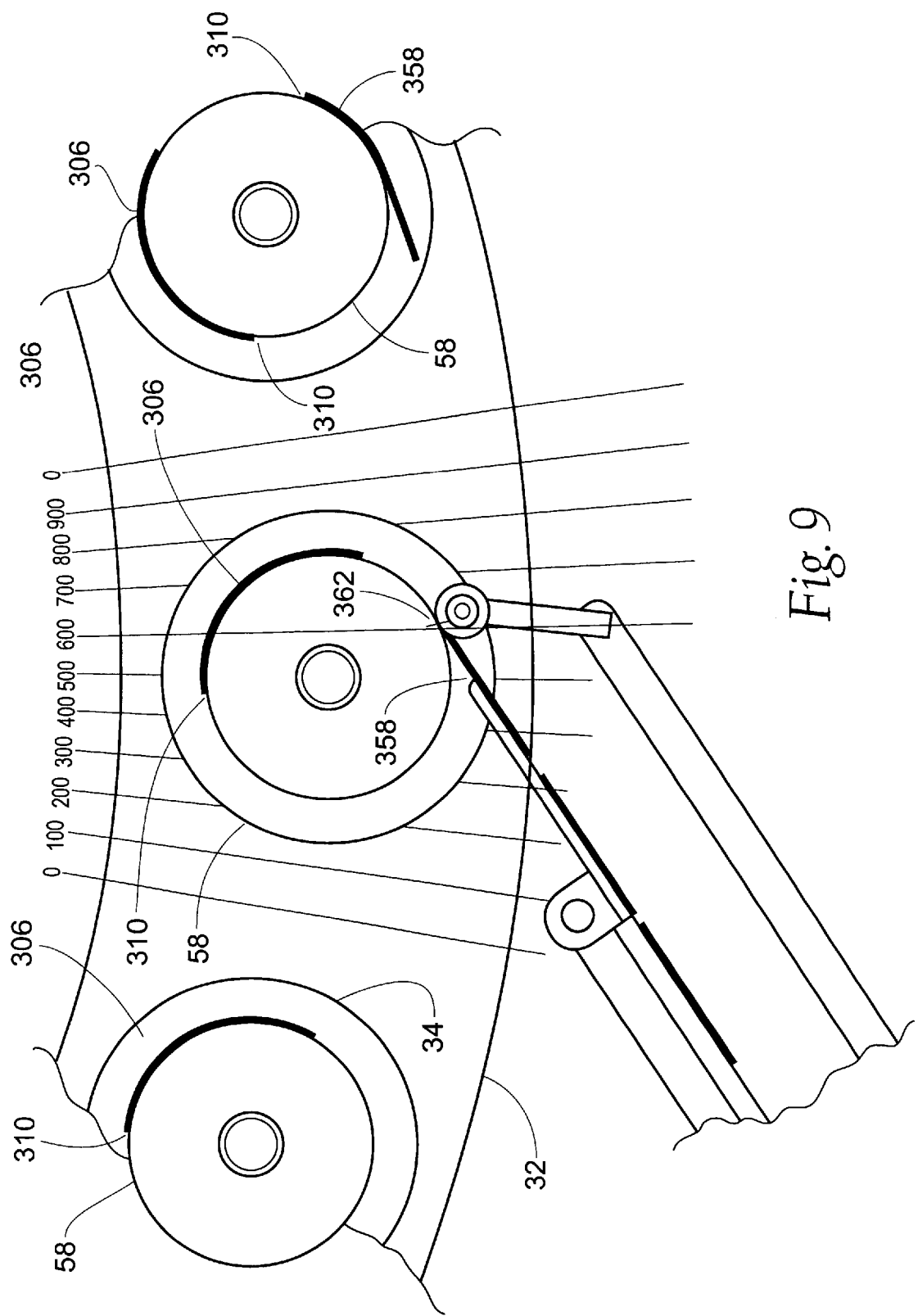
FIG. 9 is a simplified top view of the label transfer contact point on a rotary-labeling machine.

The manner in which these components of the system operate together in the system is as follows:

A known parameter, The point 362 on the container 58 where the label 306 must initially make contact for accurate placement is a known parameter see FIG. 9 362. This is referred to herein as the contact point. This point is a predetermined position on the surface of a container that is subject to customer quality placement specifications. The drawing FIG. 9 illustrates a method to coordinate the selected label contact point to a fixed object that exists on the container 58. With respect to the application of multiple labels to a single container, using the example of a front label and back label application to a single container, as indicated in FIG. 9, a problem exists with machines that use a master index machine reference position of the machine bottle table 350, with containers in pre-positioned holders 34 to determine the placement of the labels 306 and 358.

Customer specifications on label placement generally refer to the distance, edge to edge, between the two labels. Because the motion control system incorporates the use of the machine master index signaled by encoder 274 to indicate the contact point 362 of the second label 358, tolerance stackup occurs between the 2 labels during application. To achieve high accuracy placement between two labels on a container 58, the position of the first label applied 306 must be determined and used to reference the position of the application of the second label 358.

Figure 7:
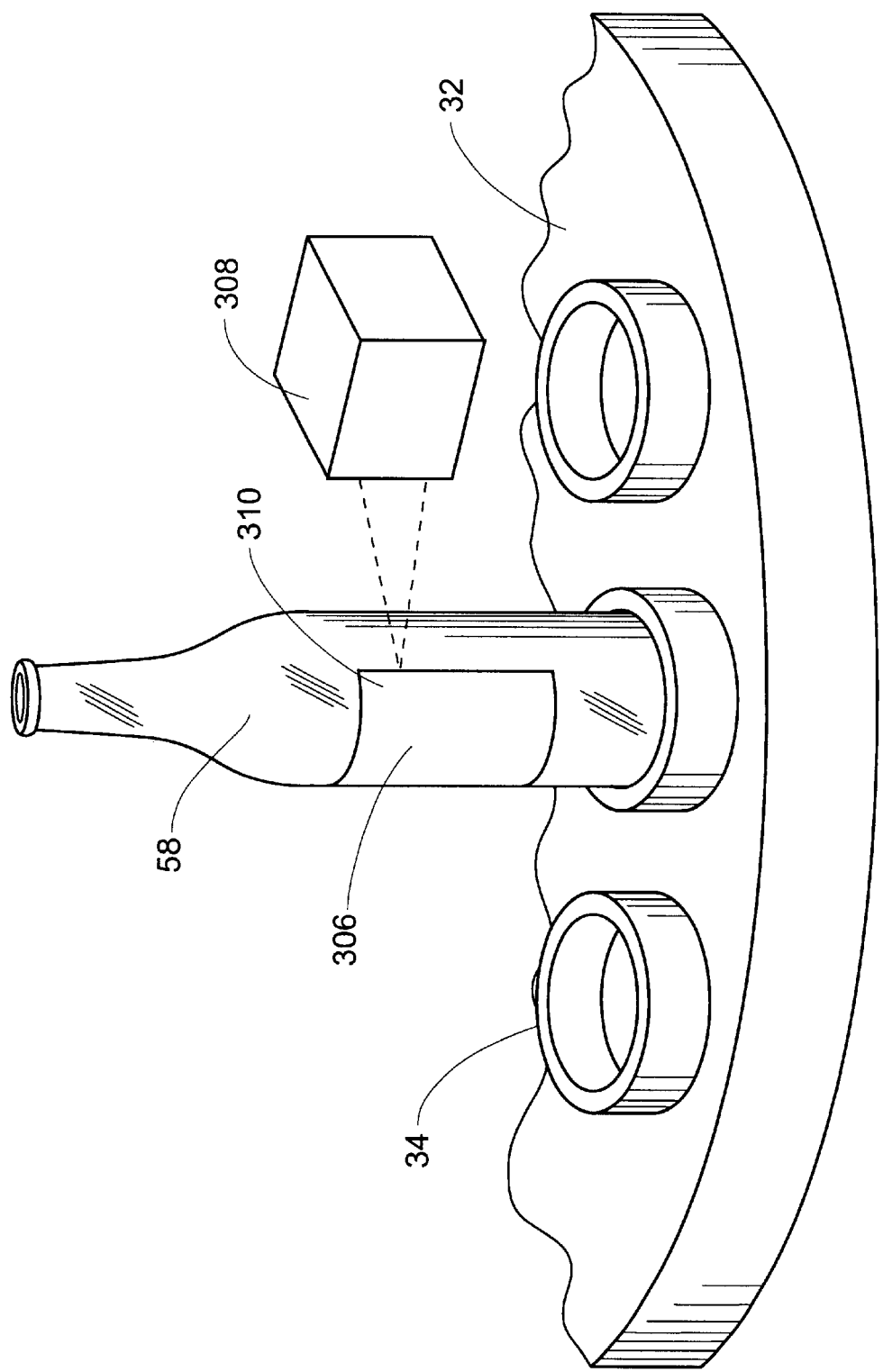
FIG. 7 is a simplified fragmentary perspective view showing a label position detector on a rotary-labeling machine.

The secondary position detection system shown in FIG. 7 adds an important feature to the system. This function allows the label application system to reference the position of an object such as label 306 on the surface of the actual physical container 58, not a theoretical position on the container surface of a container positioned on the machine base, as is the case with other labelers.

The bottle table 32 is connected to the master encoder 274. The bottle 58 is captured by the bottle plate 34. The label 306 leading edge 310 is detected by an electronic signal generator 308. The electronic signal is used to identify a corrected first label position which thus identifies any deviation or offset from the machine master index position prior to label application.

Figure 8:
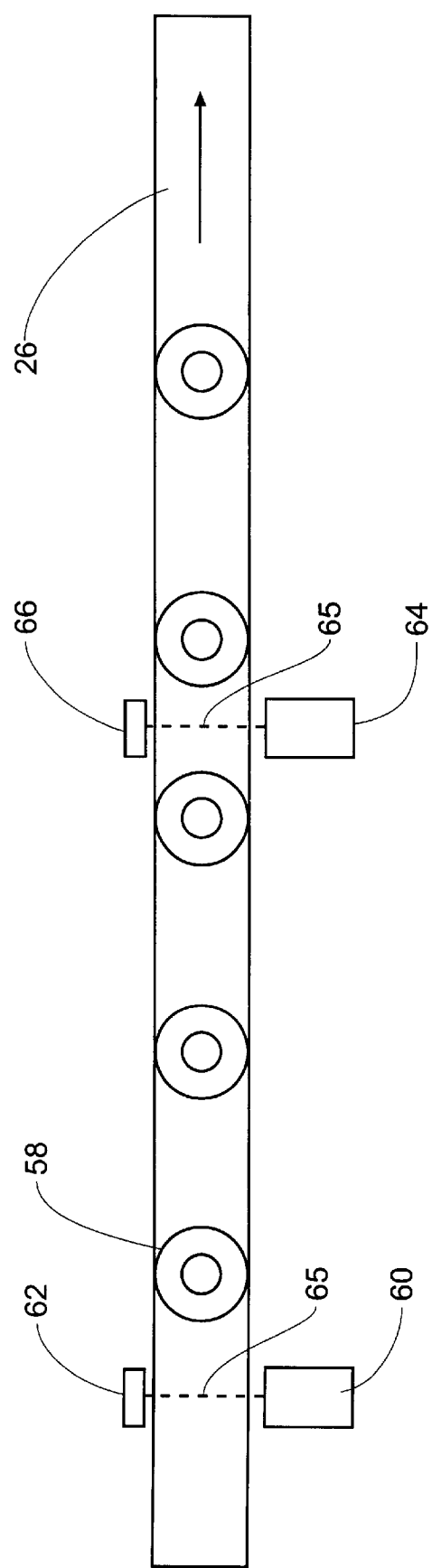
FIG. 8 is a simplified overhead view of a container position detector on an inline-labeling machine.

FIG. 8 indicates this function on an inline machine with respect to container position. Inline machines generally have problems with accurate container handing due to the fact that there are no fixtures to hold the container positions. In the case of timing belts, container slip for any reason results in position error with respect to the master encoder position.

Containers are moving in the machine on conveyor 32. Bottle present sensor 60 will electronically signal the master index position of a container 72 when the container breaks the sensor beam 65. The containers as they move through the system may develop error as to their position. The containers leading edge 72 is detected by an electronic signal generator 64 when the container breaks sensor beam 65. The electronic signal is used to identify or "position stamp" a corrected first container position offset from the container's machine master index position just prior to label application.

The motion control processor uses the master encoder counts as an index. This index acts as a time component which a non-position slaved motion control algorithm uses to generate the move profile. In the position slaved motion control algorithm, the motion control processor does not have any time component in the move profile algorithm. This unique feature enables the contact point to be consistent through all speed ranges. This is accomplished by virtue of the fact that the position feedback index acts as a variable time component resulting in variable acceleration of the slave axis, which is driving the label web. As the machine speeds up, the feedback counts enter the motion control processor at a higher rate, which in turn results in a higher acceleration rate. This variable acceleration in the position slaved motion control system is crucial to repeatable label placement accuracy of the pressure sensitive labeling head. This is because the master and the slave axes are linked together by an exact function relating the position of the master to the position of the slave. Accuracy is thus maintained at any machine speed up to the physical constraints detected by maximum achievable acceleration.

Figure 13:
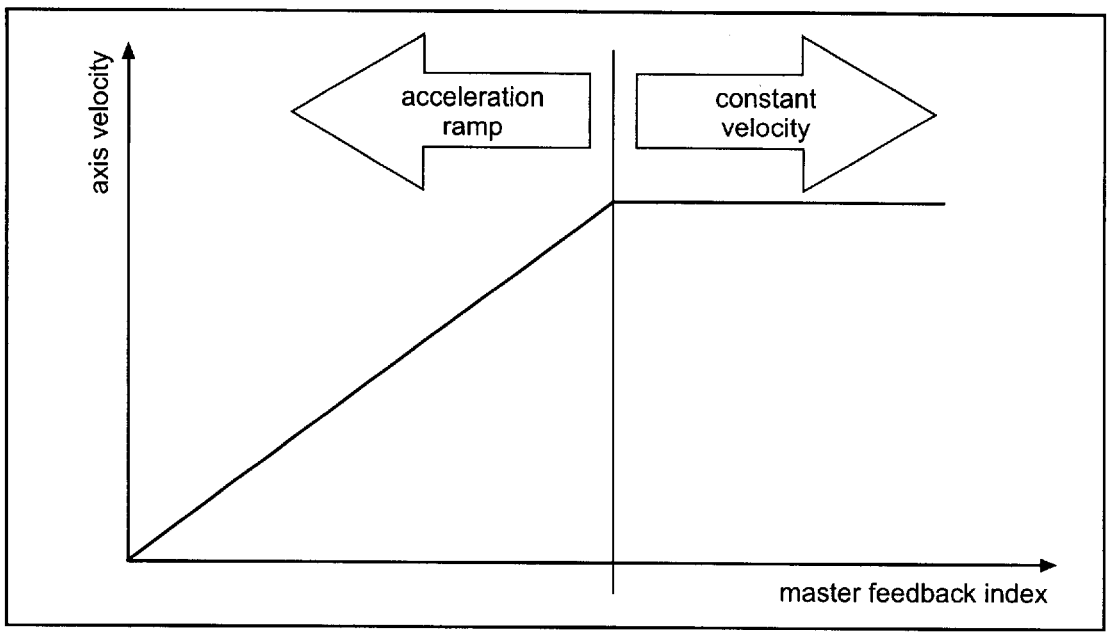
FIG. 13 shows a plot of the axis velocity vs. master feedback index.
Figure 14:
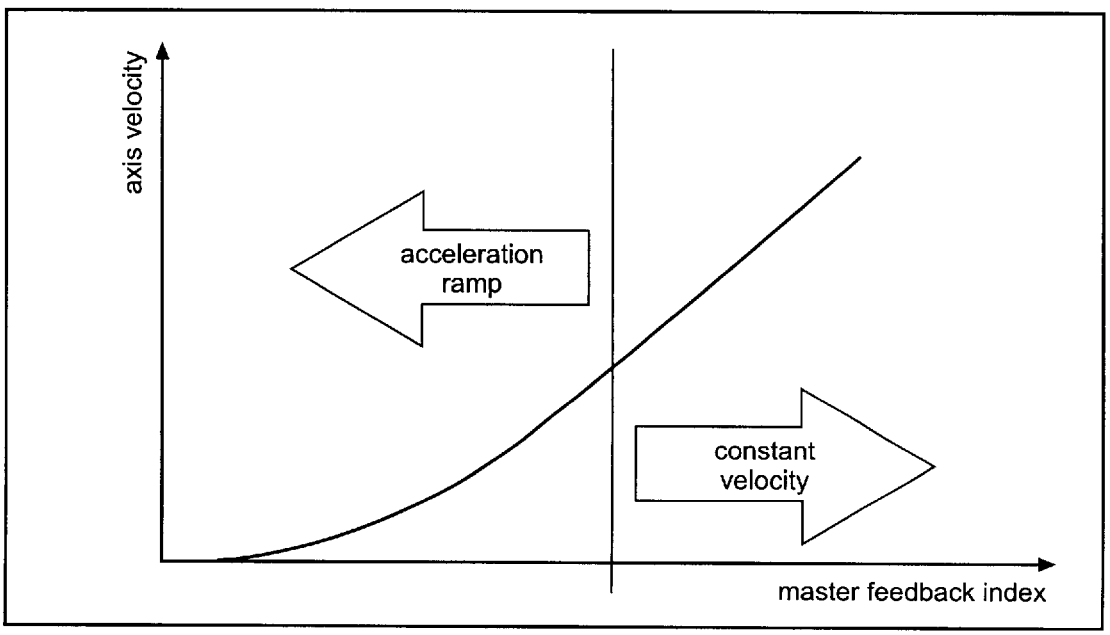
FIG. 14 shows a plot of the axis position vs. master feedback index.

As an example, we will utilize a simple move profile, which is trapezoidal as to velocity since this is a very common move. Because this is a position-based system, the profile will be defined as position of the slave as a function of the master feedback index. For the example, we will limit the scope to the first portion of the move, the acceleration, up to the constant velocity portion. If we integrate the trapezoidal function shown in FIG. 13 with respect to the master index, the position profile is readily shown to be a second order polynomial where the acceleration occurs and a positive sloping line during constant velocity as shown in FIG. 14. Note that the units of the vertical axis is position of the slave axis and the units of the horizontal axis is position of the master feedback index.

Figure 15:
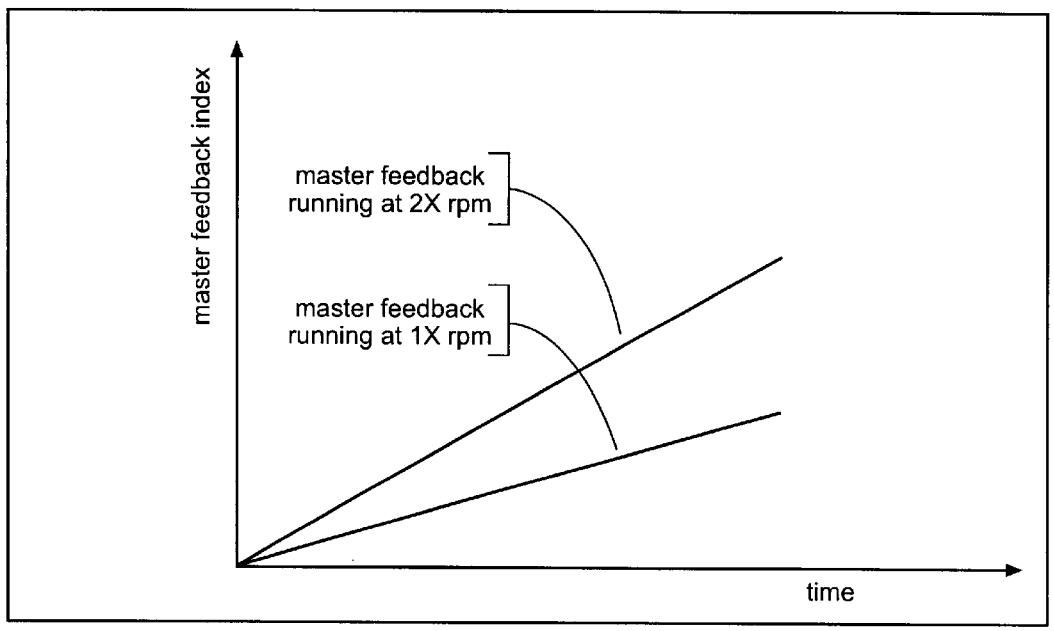
FIG. 15 shows plots of the master feedback index vs. time.

The following graph, FIG. 15, shows the relationship between the machine speed in containers per minute and the number of index counts of the master feedback versus time. We note the linear relationship of the two.

Figure 16:
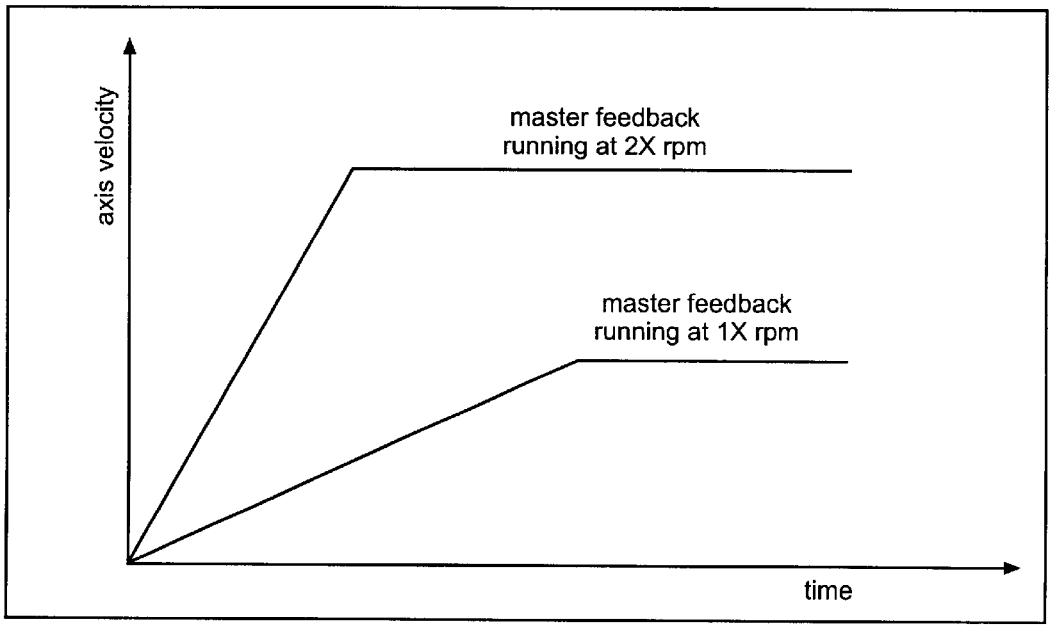
FIG. 16 shows plots of the axis velocity vs. time.

This relationship is fairly obvious, and is the reason why the position slaved system works so well for the labeling process. The relationship between the master feedback index and the slave position is a constant, and the relationship between machine speed and the master feedback index is constant. Therefore, the relationship between the machine speed and the slave, or labeling axis, is constant as illustrated in FIG. 16.

This results in the application of a pressure sensitive label by the labeling head to an actual position, rather than to a theoretical point in space.

To develop a position slaved move profile for an axis we have four distinct constraints. These constraints are:
1. The initial position.
2. The final position.
3. The initial velocity.
4. The final velocity.

To solve for such a system, the system need to be mathematically represented by four coefficients 50 that there are enough constraints to explicitly solve the equation.

To have the four coefficients a third order equation is used to represent the position of the profile. The velocity of the profile is then the first derivative of the position profile. Since the system will have an upper limit on the acceleration, the second derivative will eventually be used in determining the viability of the specific application.

$$\text{pos}(i) = a \cdot i^3 + a \cdot i^2 + c \cdot i + d$$

$$vel(i) = \frac{d}{di}(a \cdot i^3 + b \cdot i^2 + c \cdot i + d) \rightarrow vel(i) = 3 \cdot a \cdot i^2 + 2 \cdot b \cdot i + c$$

Boundary conditions are as follows:

| | |
|---|---|
| vel(0) = v0 | Velocity at start of profile |
| vel(N) = vf | Velocity at end of profile |
| pos(0) = 0 | Initial position |
| pos(N) = accel_length | Final position |

These boundary condition result in four equations and four unknowns.
Therefore the coefficients may be solved explicitly.

$$\begin{bmatrix} v_0 = 3 \cdot a \cdot 0^2 + 2 \cdot b \cdot 0 + c \\ v_f = 3 \cdot a \cdot N^2 + 2 \cdot b \cdot N + c \\ 0 = a \cdot 0^3 + b \cdot 0^2 + c \cdot 0 + d \\ accel\_length = a \cdot N^3 + b \cdot N^2 + c \cdot N + d \end{bmatrix} \text{solve,}$$

$$\begin{bmatrix} a \\ b \\ c \\ d \end{bmatrix} \rightarrow \begin{bmatrix} \text{root} \cdot v_0 = \text{root} \cdot c \\ \text{root} \cdot v_f = \text{root} \cdot (3 \cdot a \cdot N^2 + 2 \cdot b \cdot N + c) \\ 0 = \text{root} \cdot d \\ \text{root } accel\_length = \text{root} \cdot (a \cdot N^3 + b \cdot N^2 + c \cdot N + d) \end{bmatrix}$$

Given $v_0 = a \cdot 0^2 + b \cdot 0 + c$      equation 1
$v_f = a \cdot N^2 + b \cdot N + c$      equation 2

$0 = \dfrac{a}{3} 0^3 + \dfrac{b}{2} 0^2 + c \cdot 0 + d$      equation 3

$accel\_length = \dfrac{a}{3} \cdot N^3 + \dfrac{b}{2} \cdot N^2 + c \cdot N + d$      equation 4

Find(a, b, c, d) →

$$\begin{bmatrix} 3 \cdot \dfrac{(-2 \cdot accel\_length + v_0 \cdot N + N \cdot v_f)}{N^3} \\ -2 \cdot \dfrac{(N \cdot v_f - 3 \cdot accel\_length + 2 \cdot v_0 \cdot N)}{N^2} \\ v_0 \\ 0 \end{bmatrix}$$

The boundary conditions are entered into the system.
$v_0 := 0$
$v_f := 36$ accel_length:=1273 n:=38

In general purpose applications we ensure that the velocity never goes negative, we will solve for the 'b' coefficient to be zero.

Given $0 = -2 \cdot \dfrac{(n \cdot v_f - 3 \cdot accel\_length\_ + 2 \cdot v_0 \cdot n)}{n^2}$ counts: Find(n)
N:=counts
N=106.08333333

Given $v_0 = a \cdot 0^2 + b \cdot 0 + c$      equation 1

$v_f = a \cdot N^2 + b \cdot N + c$      equation 2

$0 = \dfrac{a}{3} \cdot 0 + \dfrac{b}{2} \cdot 0^2 + c \cdot 0 + d$      equation 3

$accel\_length = \dfrac{a}{3} \cdot N^3 + \dfrac{b}{2} \cdot N^2 + c \cdot N + d$      equation 4

$$\begin{bmatrix} A \\ B \\ C \\ D \end{bmatrix} := \text{Find}(a, b, c, d) \bullet \rightarrow \begin{bmatrix} 6 \cdot \dfrac{(-1273 + 18 \text{ counts})}{counts^3} \\ -6 \cdot \dfrac{(12 \text{ counts} - 1273)}{counts^2} \\ 0 \\ 0 \end{bmatrix}$$

The registration portion of the profile is then calculated $i_{reg} := 0, 1 \ldots N$ $pos\_cam(i_{reg}) := \dfrac{1}{3} \cdot A \cdot (i_{reg})^3 + \dfrac{1}{2} \cdot B \cdot (i_{reg})^2 + C \cdot (i_{reg}) + D$

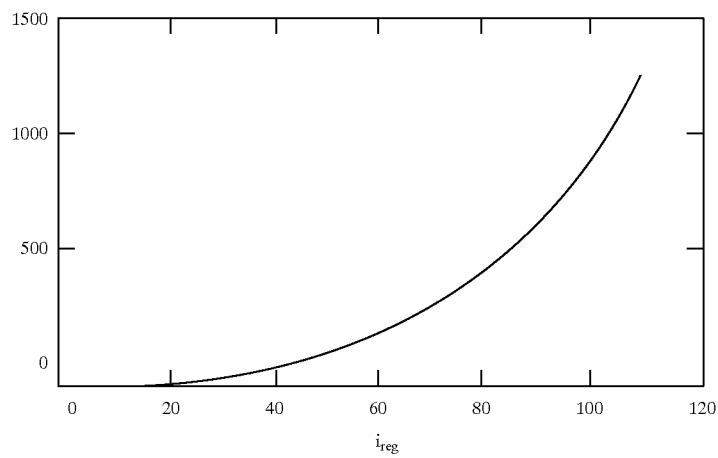

The physical properties of the move profile are calculated in the time domain to determine if the required acceleration can physically be performed by the selected motion control system. For now, we will use the standard encoder with 1000 counts per pitch and let us use 300 containers per minute to start.

enc_res:+1000
machine base encoder resolution
mach_speed:=300
desired machine base run speed roller_dia:=20
drive roller diameter
motor_res:=8000
web drive motor encoder resolution $$\text{pos\_cam\_mm}(i_{reg}) := \frac{\text{pos\_cam}(i_{reg}) \cdot \text{roller\_dia}}{\text{motor\_res}} \cdot p$$

pos_cam_mm (N) = 9.99811862

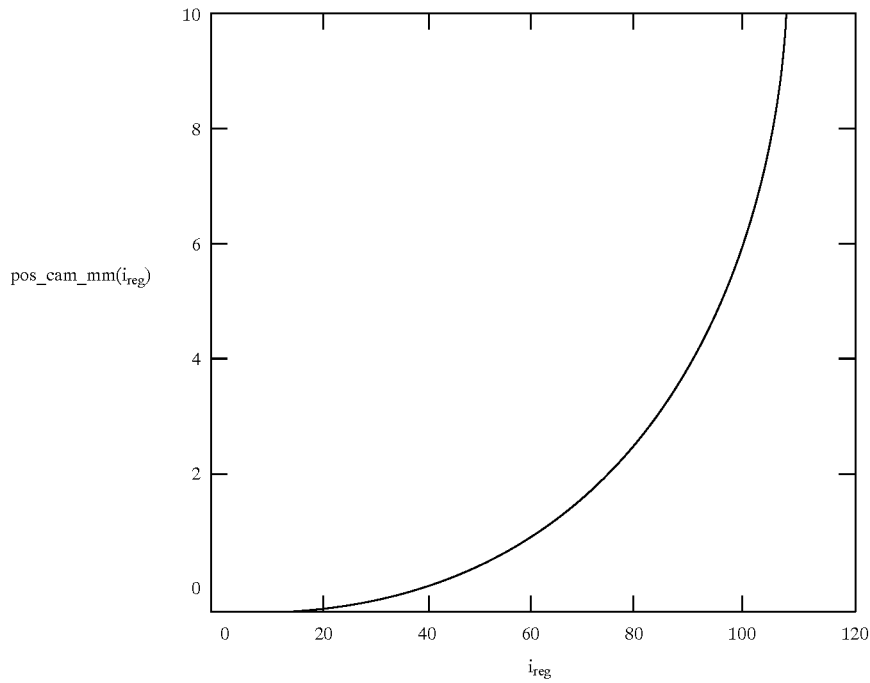

web position (mm) vs. machine pos.

The velocity of the profile is calculated by taking the first derivative of the position profile and then the acceleration of the profile by taking the second derivative of the position profile. The functions are graphed out below.

$$\text{vel\_cam}(i_{reg}) := \frac{d}{d\,i_{reg}} \text{pos\_cam}(i_{reg}) \text{enc\_res} \cdot \frac{\text{mach\_speed} \cdot \text{roller\_dia} \cdot p}{60 \cdot \text{motor\_res}}$$

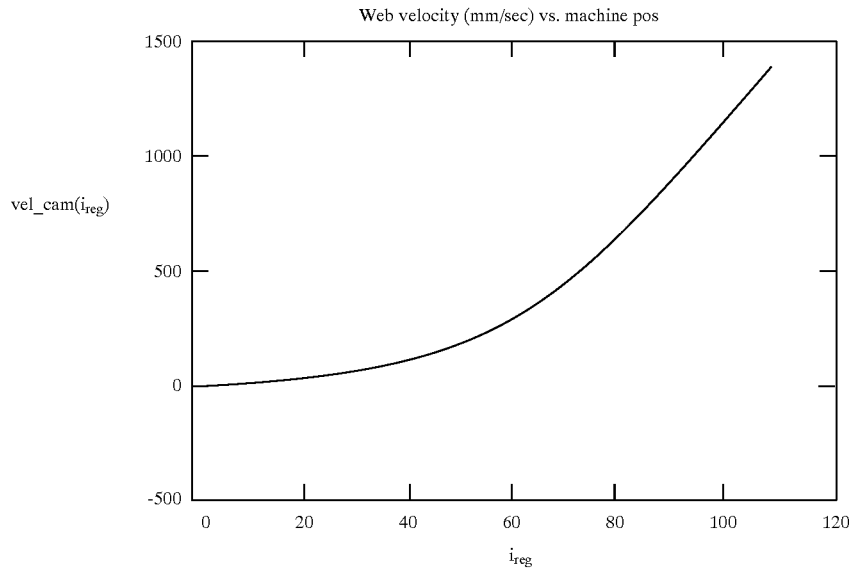

Web velocity (mm/sec) vs. machine pos $$\mathrm{accel\_cam}(i_{reg}) := \frac{d}{d\,i_{reg}} \mathrm{vel\_cam}(i_{reg}) \cdot \mathrm{enc\_res} \cdot \frac{\mathrm{mach\_speed}}{60}$$

accel_cam(N)=133264.73157412
Maximum acceleration (mm/sec2)

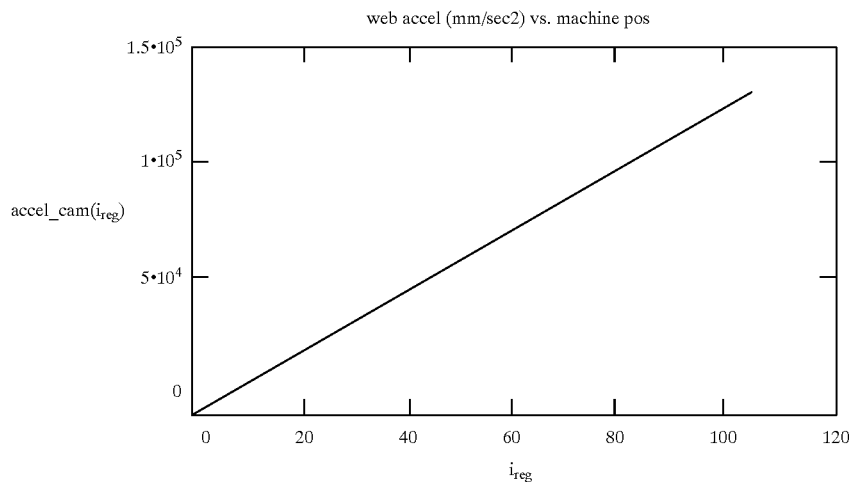

web accel (mm/sec2) vs. machine pos

As was previously discussed, the position of the applied label to the surface of a container in many customer applications is subject to specified placement tolerances. A typical placement tolerance is plus/minus 0.5 millimeters.

The design specification for this machine exceeds 100,000 millimeters per minute maximum container surface velocity. If the time domain is calculated for the placement tolerance, we find that the maximum system accumulated latency equals 300 microseconds per 0.5 millimeter of surface travel. To accomplish the final placement tolerance, it is found that the control system can contribute no more than 50% of the maximum allowable error. The remaining error will come from material and mechanical system sources.

The two systems susceptible to critical time issues are the motion control system, FIG. 10, (also shown in component blocks 521, 522, 524, 526, 530 in FIG. 19) and the position control processor 522, 528, 534. The timing issues are critical for the digital signals connecting the position control processor to the motion control processor. The specification for the maximum accumulated interrupt service routine latency of the motion control processor 520, FIGS. 17 and 19, which includes high speed input reaction time, and motion algorithm "math intensive task" completion is 125 microseconds. The specification for the position control processors position command latency is 25 microseconds. Because of the demanding requirements of this system, the following details relating to the position control processor 520 are included herein.

Figure 18:
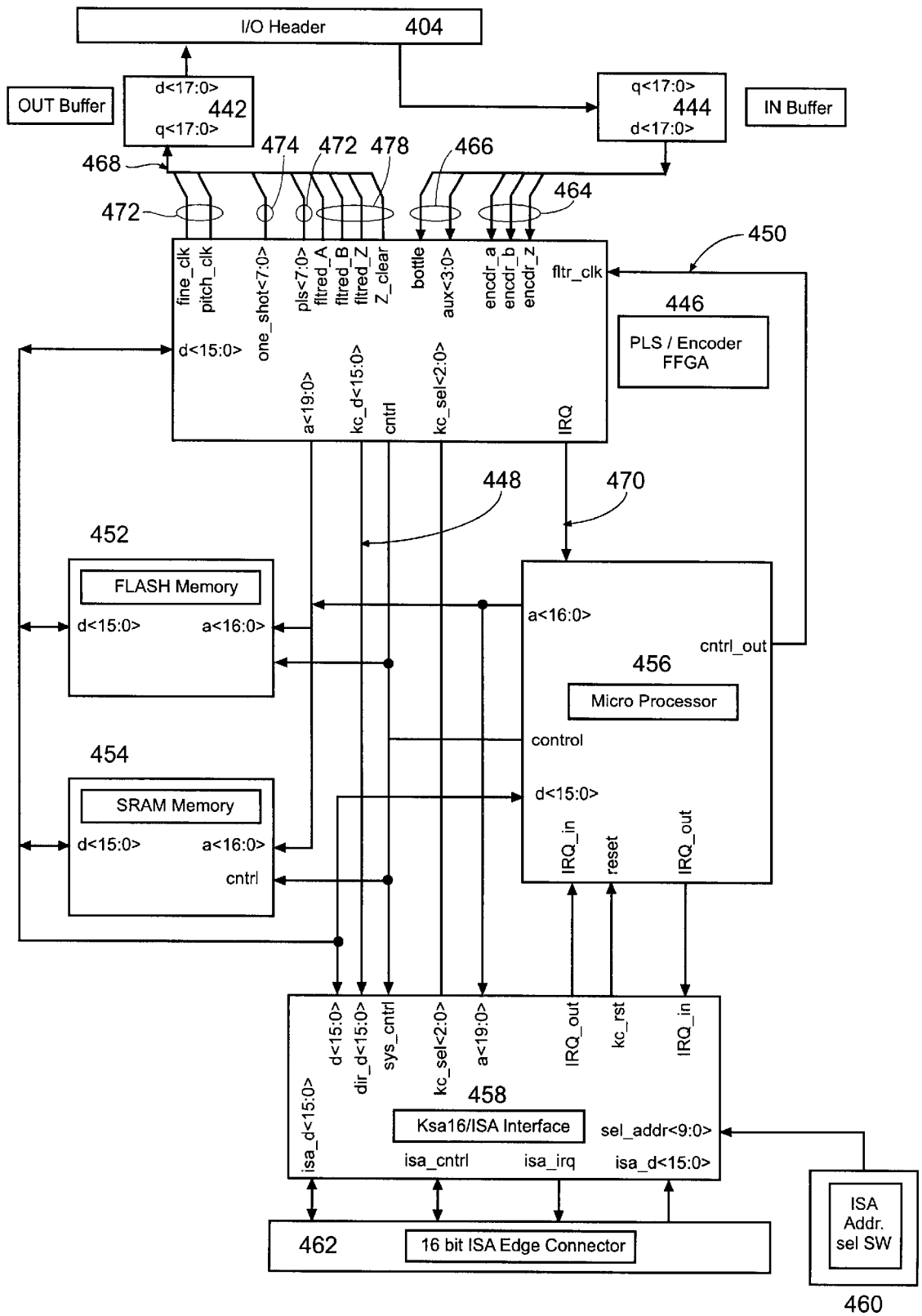
FIG. 18 is a simplified block functional diagram of an encoder processing system, consisting of a hardware processing system, a micro processor which provides software based encoder signal processing, and an interface to a host system bus; and, FIG. 19 is a simplified block diagram of the encoder processing hardware.

With reference to FIG. 18 there is shown an PLS/Encoder FPGA 446 which accepts signals from a quadrature encoder 464 and various sensors 466, processes these signals, and in conjunction with a micro processor 456, generates a set of control outputs 468.

The PLS/Encoder FPGA 446 takes advantage of the fact that although a mechanical device may be operating at a high rate of speed the time required for an encoder to move from one discrete position to the next is relatively long when compared to the clock rate capability of high speed logic devices. The PLS/Encoder FPGA 446 uses the time between encoder steps to manipulate a set of control outputs 468 and to warn the system microprocessor 456 of impending significant events by use of an interrupt signal 470. A more detailed description of the operation of the PLS/Encoder FPGA 446 will follow.

The PLS/Encoder FPGA 446 is responsible for driving the outputs, 472 and 474, which are scheduled to occur within the next full rotation (pitch) of the encoder. The system microprocessor is responsible for scheduling output events that must be delayed for one or more full encoder rotations. The PLS/Encoder FPGA can provide multiple interrupts 470 to the system micro processor 456 during a single encoder rotation such that the microprocessor 456 will have ample opportunity to configure the output control circuits of the PLS/Encoder FPGA when delayed output events now falls within the current encoder rotation (pitch). Splitting the responsibility for the inter and intra pitch events between the microprocessor 456 and the PLS/Encoder FPGA 446 greatly reduces the processing requirements imposed on the microprocessor 456 and increases the achievable system performance.

All of the signals which are input to the PLS/Encoder FPGA 446 are connected at a header 440 and are sensed and ESD protected by an input buffer 444. All of the signals which are output from the PLS/Encoder FPGA 446 are buffered and ESD protected by an output buffer 442 and are made available at a header 440.

Also shown in FIG. 18 is a general-purpose microprocessor system which consists of a microprocessor IC 456, FLASH type program memory 452, and SRAM data memory 454. The microprocessor 456 works in conjunction with the PLS/Encoder FPGA 446 to generate the various control signals 468. The micro processor 456 also generates a clock signal 450 which is used by the PLS/Encoder FPGA 446 to sample and filter the sensor inputs 466 and the encoder inputs 464.

As shown in FIG. 18 a host system bus interface consisting of an interface IC 458, the board address select switch 460, and a bus interface connector 462 is provided. The interface IC 458 provides a bridge between the host system bus and the native bus protocol of the microprocessor 456. Although an ISA bus is indicated in FIG. 18, any host bus could be utilized by simply reconfiguring the function provided by the interface IC 458. In addition to the bus bridge function, the interface IC 458 also implements a direct connection 448 to the PLS/Encoder FPGA 446, this provides high speed access to hardware based information, such as encoder position, without requiring intervention by the system micro processor 456.

FIG. 18 provides a more detailed view of the PLS/Encoder FPGA 446, in order to simplify this diagram all address decoding and chip select functions which are performed in order to access the various hardware resources have been omitted.

Figure 19:
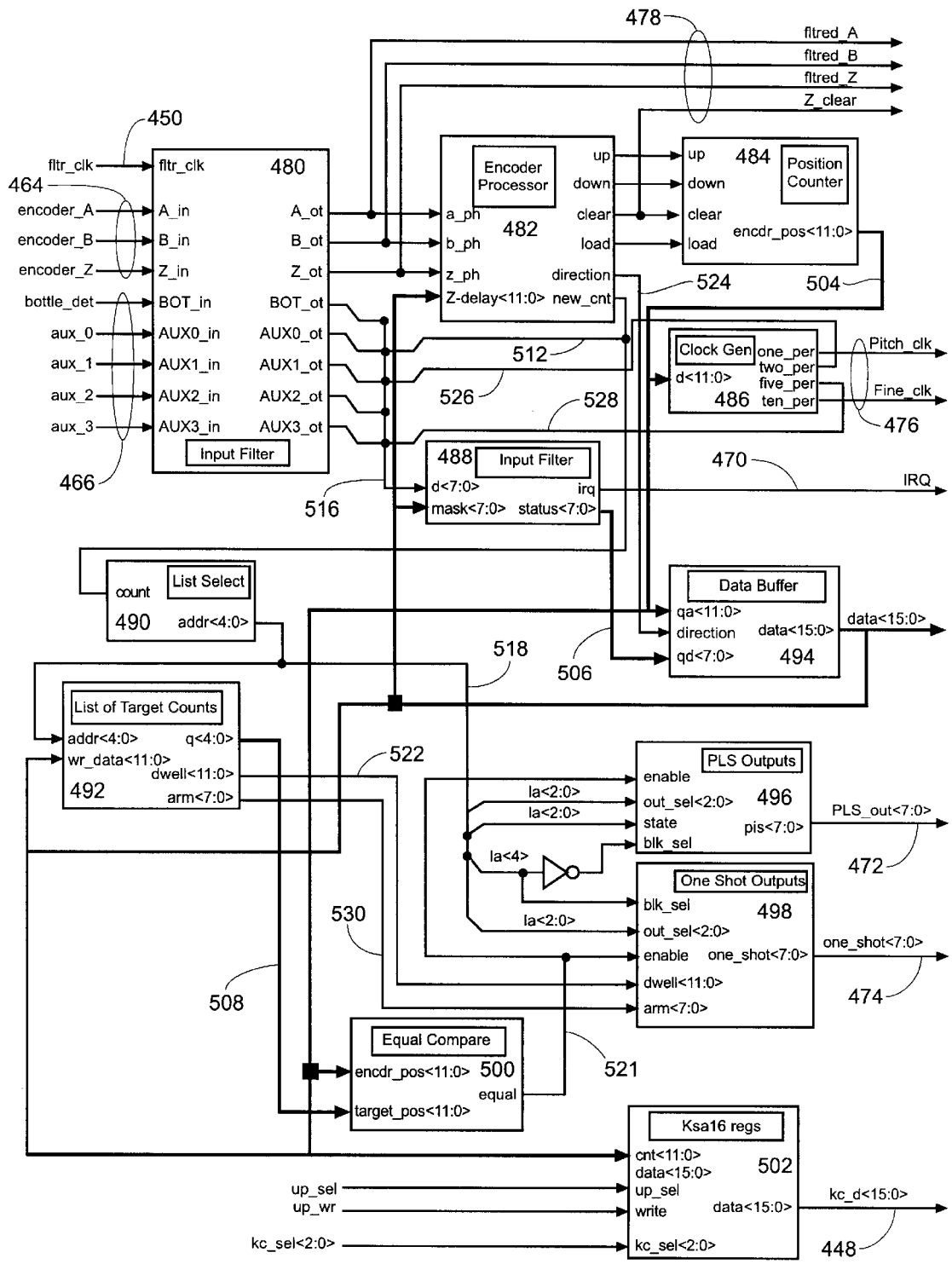

As shown in FIG. 19, all sensor 466, and encoder 464 signals which are input to the PLSEncoder FPGA 446 are digitally filtered. The signals are filtered in order to minimize the detection of false signal transitions due to the noise inherent in most installations. The Digital Filter 480 consists of an N bit shift register connected to each input, where N is typically a small integer. The input signal is continuously shifted on the active edge of the filter clock 450, when all N bits of the shift register are at the same logic level the digital filter output is switched to that level. The output level is held until all N bits of the shift register are detected to be at the opposite logic level. The filter clock used by the Digital Filter is sourced from the system microprocessor 456 (FIG. 18). The Digital Filter 480 also synchronizes the filtered outputs to the high frequency clock that drives all of the remaining logic of the PLS/Encoder FPGA 446.

The three encoder signals 464 that have been filtered 478 are passed to the Encoder Processor 482. The Z_ph input is a reference pulse from the encoder which is active once during every rotation (pitch) of the encoder. The other two inputs, (A_ph & B_ph), are the quadrature signals from the encoder, the phase relationship between these two signals is used to determine the direction of encoder rotation, the edge transitions of these two signals are used to derive an absolute angular position measurement.

The Encoder Processor 482 tracks the A_ph and B_ph inputs, and monitors the Z_ph input 478 in order to generate control signals for a Position Counter 484 which tracks the absolute angular position of the encoder shaft. The operation of the control signals depends on the direction of rotation, when the A_ph signal leads the B_ph signal by 90 degrees the encoder is considered to be rotating in the forward direction, when B_ph leads A_ph by 90 degrees the direction of rotation is considered to be backwards.

The Encoder Processor 482 also contains a Z delay register, which is loaded by the on board microcontroller 456. This function allows the set of position referenced system parameters to remain constant when a new encoder is installed. The new encoder will almost certainly be installed with a rotational offset relative to the old encoder. The rotational offset is compensated for by delaying the reset of the encoder position count by 'n' A_ph and B_ph edges after a Z_ph 478 input is detected, 'n' is the value stored in the Z delay register. It should be noted that up to one complete revolution of the encoder is required for a new Z delay to become effective.

As previously noted, the filtered encoder signals 478 are used to generate control signal to a Position Counter 484 which tracks the absolute angular position of the encoder shaft. In order to track the angular position the counter 484 must be capable of counting up, counting down, clearing to zero, and loading to the maximum count value. The maximum count value is defined to be equal to the number of counts per revolution of the encoder times 4 A_ph and B_ph edges per encoder count. For example a 1000 count encoder will have a maximum count of 4000 edges per revolution. The specific operation of the counter control signals generated by the Encoder processor 482 is as follows:

The Encoder Processor will issue a DOWN, or a LOAD if the Z delay has expired, when one of the following is true:
B_ph is logic 0 and A_ph has a high to low transition.
B_ph is logic 1 and A_ph has a low to high transition.
A_ph is logic 0 and B_ph has a low to high transition.
A_ph is logic 1 and B_ph has a high to low transition.

The Encoder Processor will issue an UP, or a CLEAR if the Z delay has expired, when one of the following is true:
B_ph is logic 0 and A_ph has a low to high transition.
B_ph is logic 1 and A_ph has a high to low transition.
A_ph is logic 0 and B_ph has a high to low transition.
A_ph is logic 1 and B_ph has a low to high transition.

The Encoder Processor 482 will issue a one system clock cycle wide NEW_COUNT signal 512 on any change in count, this is essentially a logical 'OR' of LOAD, CLEAR, UP, and DOWN.

A DIRECTION signal 524 is maintained by the Encoder Processor 482, the signal will be at a logic low when the rotation direction is forward and logic high when the rotation direction is backward.

The Input Filter 480 and the Encoder Processor 482 provide a set of signals 478 which allow external motion control systems to have access to the angular position information generated by the PLS/Encoder FPGA 446. The A, B, and Z outputs are copies of the encoder inputs delayed by the Digital Input Filter 480, the Z_CLEAR output will go active approximately 100 nS before an A or B output edge at which the Encoder Position Counter will be reset. The Z_CLEAR output is required since the use of the Z delay feature precludes the use of the three encoder phases to determine the zero reference point of the system.

As previously noted the control signals output from the encoder processor 482 are used to control a Position Counter 484 which maintains a value which represents the absolute angular position of the encoder shaft. Since the Position Counter 484 is changed at every edge transition of both the A_ph and B_ph signals the angular position measurement resolution is equal to one fourth of an encoder count. For example the angular position of a 1000 count per revolution encoder can be tracked down to 1/4000 of a revolution which is 0.0016 radians (0.09°).

Since the number of counts per revolution of an encoder is typically not a power of two the Position Counter 484 must be designed to count down from zero to the maximum count and count up from the maximum count to zero. As previously noted the maximum count is four times the number of counts per revolution of the encoder. This maximum count values can either be hard wired into the hardware design or implemented as a configurable register located within the Position Counter 484 circuit.

The absolute angular position output 504 from the position counter 484 is used by the Clock Gen circuit 486 to generate a set of position based periodic signals. All of the signals output from the Clock Gen circuit 486 are driven to logic 0 when the absolute angular position 504 equals 0.

Two of the signals 476 generated by the Clock Gen circuit 486 are used by external control systems as position references, the pitch_clk signal provides one cycle per encoder revolution while the fine_clk signal provides 10 cycles per revolution.

Two of the signals issued by the Clock Gen circuit 486 are used to interrupt the system micro controller 456 at various reference positions within one revolution of the encoder. One of the signals 526 will provide two interrupts per revolution while the second signal 528 will provide five interrupts per revolution.

In addition to the two position based signals, 526 and 528, generated by the Clock Gen circuit 486, the PLS/encoder FPGA 446 can generate an interrupt to the micro processor 456 whenever the encoder position 504 changes and when an active edge is detected at any of the sensor inputs 466. The interrupt signal 470 is generated by the Transition Detect circuit 488 when an active edge transition is detected at any of the inputs 516. A status register is maintained within the Transition Detect circuit 488, the register 506 can be read by the system microprocessor 456 so that the source of the interrupt can be determined. Any of the inputs to the Transition Detect circuit 488 can be masked in order to block the activation of the interrupt 470 for that source, this register is written by the system microprocessor 456.

When the system micro processor 456 reads data from the PLS/Encoder FPGA 446 the Data Buffer 494 routes the desired data from the PLS/Encoder FPGA's internal data bus to the system processor's data bus based on the address used for the access. The system microprocessor can either read the state of the Transition Detect 488 status register 506, or the current encoder position 504 and the current encoder rotation direction 524.

Whenever the Encoder Processor 482 issues a NEW_COUNT signal 512 to indicate that the encoder position has changed the List Select circuit 490 will sequence though a series of 24 addresses 518. The time required to scan through the 24 addresses and perform the operations associated with each determines the encoder resolution and rotational speed, which can be handled by the PLS/Encoder FPGA 446. For example if the PLS/Encoder FPGA 446 is operating at 25 Mhz and each address requires 8 clock cycles to process the address scan will take 7.7 uS, so a 4000 edge encoder (1000 cnts/rev) can be processed in abut 31 mSec which correlates to a rotational speed of about 1900 RPM. The preceding example assumes no software over head for scheduling output events, it is expected that the actual obtainable rotational velocity will be about one half of the base hardware speed or 950 RPM for a 4000 edge encoder (1000 cnts/rev).

Each List Select address 518 will simultaneously select.
The output group, PLS 496 or One Shot 498, to operate on.
The specific output within the selected group, one of 472 or 474.
The state to which a selected PLS output 472 is to be driven.
The on time (dwell) for a selected One Shot output 474.
The encoder position 508 at which the output operation is to occur.

The encoder position at which the output event is to occur 508 is read from a List of Target Counts 492 and compared to the current encoder position 504 by the Equality Compare circuit 500. If the current position 504 is equal to the target position 508, as indicated by signal 521 becoming active, the selected output event will occur.

Each PLS output 472 is associated with two List Select addresses 518 which access target encoder positions 508 stored in the List of Target Counts 492. One address selects the target encoder position 508 at which the output 472 is to be driven active, the second address selects the target encoder position 508 at which the output is to be driven inactive.

Each One Shot output 474 is associated with a single List Select Address 518, this address selects the encoder position at which the output 474 is to be driven active from the List of Target Counts 492. The same address 518 also selects the on time (dwell) for the output from the List of Target Counts 492.

The List of Target Counts 492 is stored in on chip dual port RAM. The write port is connected to the on board micro controller 456 bus, the values in the RAM can be updated on a random access basis at any time. The read side of the dual port RAM is controlled by the List Select circuit 490, as previously described.

The One Shot Outputs control circuit 498 shown in FIG. 19 requires that the an output be rearmed after each operation, this is accomplished by having the system micro processor 456 rewrite the on time (dwell) value for the particular one shot output 474. This was done to allow the system microprocessor to make adjustments to the firing position and on (dwell) time for these outputs 474 while operating at full speed.

The Ksa16 Reg circuit 502 provides for direct access to the encoder position and several mailbox registers from the host backplane interface 458. This direct access scheme allows the host system to quickly access the most frequently required data without impacting the performance of the system processor 456.

What is claimed is:

1. Apparatus for applying, sequentially, a label to each of a series of containers comprising,
    a machine base,
    means for loading a plurality of containers in sequence onto said machine base,
    means for holding and transporting said containers in spaced apart relationship on said machine base,
    a label applicator device operative to convey labels individually in succession in a manner such that each label contacts an associated container transported to a position proximate to the label applicator device,
    a servomotor for controlling the position and velocity of said labels,
    a microprocessor operatively connected to control said servomotor,
    a position feedback device coupled to said machine base and to said microprocessor for continually providing information to said microprocessor identifying the location of each of said containers on said machine base,
    a registration sensor positioned adjacent said labels to identify the position of each said label, said registration sensor being coupled to said microprocessor, and
    a position correction sensor positioned adjacent said labels to identify the position of a surface artifact, said position correction sensor being coupled to said microprocessor, whereby said microprocessor utilizes signals provided by said position feedback device, said registration sensor, and said position correction causing said servomotor to direct each successive label to be applied to a selected position on each associated container relative to the location of said surface artifact on said container.

2. Apparatus according to claim 1 wherein said labels are coated on one side with a pressure sensitive adhesive and said labels are carried on a transport carrier web from which they are separated as they are applied to a container.

3. Apparatus according to claim 2 wherein said position feedback device comprises a rotary encoder which makes one revolution when said turntable rotates a distance equal to the distance between two adjacent containers.

4. Apparatus according to claim 1 further comprising a sensor for detecting the presence of a container in a container holder of said turntable, said sensor being operatively connected to said microprocessor whereby said microprocessor causes said label applicator to apply a label to a detected container.

5. Apparatus according to claim 1 further comprising an encoder coupled to said servomotor for providing feedback to said microprocessor identifying the position and velocity of said labels.

6. Apparatus according to claim 1 wherein said machine base comprises a turntable which is driven rotationally about a vertical axis, and,
    a plurality of container holders arranged in circumferentially spaced apart relationship on the turntable for transporting containers sequentially in a circular path.

7. Apparatus according to claim 6 comprising means for turning said holders about a vertical axis.

8. Apparatus according to claim 7 comprising means for conveying the containers from said turntable after label application.

9. Apparatus according to claim 1 wherein said position correction sensor further comprises a sensor for detecting labels on the surface of the container, said position correction sensor being operatively connected to said microprocessor, said position correction sensor identifying the position of said labels.

10. Apparatus according to claim 9 further comprising means to modify the defined contact position of a label on the surface of an associated container derived from information operatively received from the position correction sensor.

11. Apparatus according to claim 1 further comprising a position feedback device coupled to said servomotor and providing feedback to said microprocessor identifying the position of said labels.

12. Apparatus according to claim 1 comprising means for generating at least three separate functions to construct a motion profile, including, a first function, defining a pre-labeling move for accelerating the web at a calculated function of a detected position of the machine base position feedback device to achieve a defined contact position on an associated container, a second function for applying each successive label which is a function of the machine base position and the geometry of the surface of said associated container during application, and, a post-labeling function for decelerating the carrier web material after application of said label.

* * * * *